US012632475B2

(12) United States Patent
Song et al.

(10) Patent No.: US 12,632,475 B2
(45) Date of Patent: May 19, 2026

(54) DATASET RELATION EXPLORER

(71) Applicant: SAP SE, Walldorf (DE)

(72) Inventors: Jian Song, Xi'an (CN); Guibin Peng, Xi'an (CN); Jiachen Guo, Xi'an (CN); Jingtao Li, Xi'an (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/910,548

(22) Filed: Oct. 9, 2024

(65) Prior Publication Data

US 2026/0099512 A1     Apr. 9, 2026

(51) Int. Cl.
*G06F 16/28* (2019.01)
*G06F 16/25* (2019.01)

(52) U.S. Cl.
CPC .......... *G06F 16/287* (2019.01); *G06F 16/256* (2019.01)

(58) Field of Classification Search
CPC ............................. G06F 16/287; G06F 16/256
USPC ......................................................... 707/737
See application file for complete search history.

(56) References Cited

U.S. PATENT DOCUMENTS

| | | | | | |
|---|---|---|---|---|---|
| 2005/0102373 | A1* | 5/2005 | Grinberg | ................. | G06F 16/10 |
| | | | | | 709/217 |
| 2006/0155691 | A1* | 7/2006 | Lowe | ................. | G06F 16/3322 |
| 2012/0185445 | A1* | 7/2012 | Borden | .................. | G06F 16/20 |
| | | | | | 707/E17.007 |
| 2013/0198636 | A1* | 8/2013 | Kief | ...................... | G06F 16/958 |
| | | | | | 715/730 |

| | | | | | |
|---|---|---|---|---|---|
| 2016/0103899 | A1* | 4/2016 | Zheng | ................... | G06F 16/284 |
| | | | | | 707/602 |
| 2016/0328406 | A1* | 11/2016 | Convertino | ......... | G06F 16/9535 |
| 2021/0365344 | A1* | 11/2021 | Bui | .......................... | G06F 17/18 |
| 2024/0202225 | A1* | 6/2024 | Siebel | .................... | G06N 20/00 |
| 2025/0045308 | A1* | 2/2025 | Rogynskyy | ......... | G06F 16/3334 |
| 2025/0156479 | A1* | 5/2025 | Borochoff | ........... | G06F 16/9024 |
| 2025/0190471 | A1* | 6/2025 | Silver | .................... | G06F 16/31 |

FOREIGN PATENT DOCUMENTS

| | | |
|---|---|---|
| WO | 2022020005 | 1/2022 |

OTHER PUBLICATIONS

"European Application Serial No. 25195749.4, Extended European Search Report mailed Jan. 30, 2026", 8 pgs.

* cited by examiner

*Primary Examiner* — Cam Y T Truong
(74) *Attorney, Agent, or Firm* — SCHWEGMAN LUNDBERG & WOESSNER, P.A.

(57) ABSTRACT

Systems and methods described herein facilitate exploration of relationships between datasets. A target dataset is selected by a user device. Metadata of the target dataset is compared with metadata of other datasets of a plurality of datasets to identify first candidate datasets. A metadata embedding of the target dataset is compared with metadata embeddings of at least some of the other datasets to identify second candidate datasets. Prompt data is processed by a language model to generate output that identifies related datasets for the target dataset. The prompt data comprises an instruction to select the related datasets from among the first candidate datasets and the second candidate datasets. A visual representation is generated based on the output of the language model to show relationships among the target dataset and the related datasets. The visual representation is presented in a user interface at the user device.

20 Claims, 13 Drawing Sheets

400

START — 402

CAUSE PRESENTATION OF USER INTERFACE FOR EXTRACTION — 404

RECEIVE, VIA USER INTERFACE, EXTRACTION REQUEST — 406

ACCESS DATA SOURCE(S) — 408

EXTRACT METADATA — 410

STORE METADATA — 412

PROCESS METADATA USING MACHINE LEARNING LANGUAGE MODEL TO GENERATE METADATA EMBEDDINGS — 414

STORE METADATA EMBEDDINGS — 416

UPDATE USER INTERFACE AT USER DEVICE TO CONFIRM EXTRACTION — 418

END — 420

DATASET RELATION EXPLORER

TECHNICAL FIELD

The subject matter disclosed herein generally relates to data processing, data discovery, and data exploration. More specifically, but not exclusively, the subject matter relates to systems and methods for automatically identifying and visualizing relationships between different datasets.

BACKGROUND

Data discovery tools can facilitate navigation through large data repositories, such as data warehouses or data lakes. While data discovery tools are often effective in the context of exploring an individual target dataset, technical challenges can arise in identifying and exploring relationships between a target dataset and other datasets.

BRIEF DESCRIPTION OF THE DRAWINGS

Some examples are shown for purposes of illustration and not limitation in the figures of the accompanying drawings. In the drawings, which are not necessarily drawn to scale, like numerals may describe similar components in different views or examples. To identify the discussion of any particular element or act more easily, the most significant digit or digits in a reference number refer to the figure number in which that element is first introduced.

DETAILED DESCRIPTION

Figure 1:
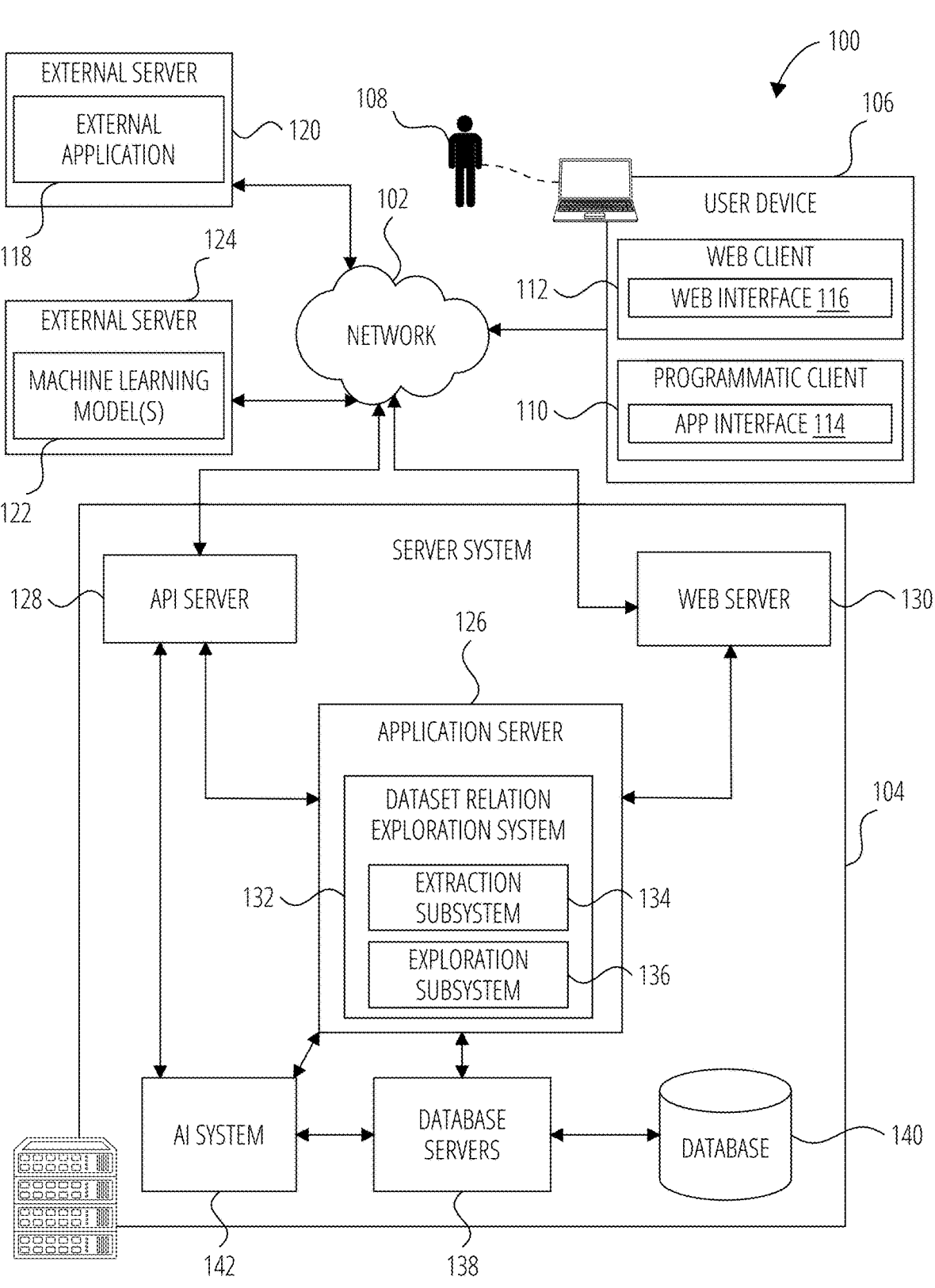
FIG. 1 is a diagrammatic representation of a network environment that includes a dataset relation exploration system, according to some examples.

A "dataset," as used herein, may include a set or collection of structured or unstructured data that can be processed, accessed, retrieved, analyzed, or explored. Datasets may consist of or include various types of information, such as tables, views, files, or other data containers. Datasets can be accessed or retrieved from various data sources, such as databases, data warehouses, or data lakes. Datasets can vary in size, complexity, and format, ranging, for example, from small, simple tables to large, complex data structures.

Examples described herein provide systems and methods for exploring dataset relations. In some examples, a dataset relation exploration system leverages embedding and reasoning capabilities of a generative machine learning model, such as a language model (e.g., a Large Language Model (LLM)), for intelligent data discovery, and visually represents relations in a user interface. In some examples, the dataset relation exploration system overcomes technical limitations of conventional matching mechanisms to enable users to explore relations between datasets swiftly and efficiently and locate data within datasets.

In some examples, an extraction stage involves extracting metadata from various datasets and generating embeddings to form the basis for subsequent exploration. During an exploration stage, the dataset relation exploration system uses extracted metadata and embeddings to detect related datasets based on both technical and semantic relationships. A user can explore or customize relations via an interactive interface that visualizes datasets and their relationships (e.g., in a graph format).

"Technical matches," as used herein, may include datasets identified as related to a target dataset based on metadata matches or similarities. These metadata matches may be determined by comparing specific attributes or characteristics of datasets. Technical matches may include, for example, datasets sharing common columns that could be used for database joins, datasets with related lineage information (e.g., parent-child relationships), datasets tagged with the same categories or labels, or datasets created by the same user or system process.

"Semantic matches," as used herein, may include datasets identified as related to a target dataset based on similarity of content or meaning, rather than strict structural or technical similarities (e.g., as opposed to technical matches). In some examples, semantic matches are determined by comparing numerical or vector representations (e.g., embeddings) of respective metadata of the datasets. Semantic matching may identify datasets that are conceptually related even if they do not share identical keywords, links, correspondences, or structures. In some examples, semantic matches also include other relations between data, such as semantic opposites or semantic inclusion, as discussed elsewhere in the present disclosure.

An example method includes receiving a selection of a target dataset of a plurality of datasets. For example, a user identifies a dataset of interest (e.g., during a keyword search) and selects the dataset of interest as the "target dataset" for further exploration or analysis.

The method includes automatically identifying related datasets for the target dataset. In some examples, the process of automatically identifying the related datasets starts with a process of generating two sets of candidates: first candidate datasets and second candidate datasets. The first candidate datasets are identified by comparing metadata of the target dataset with the metadata of other datasets of the plurality of datasets (e.g., by performing technical matching operations). The second candidate datasets are identified by comparing a metadata embedding of the target dataset with metadata embeddings of the other datasets (e.g., by performing semantic matching operations). In some examples, the first candidate datasets are obtained by querying a relational database and analyzing results, while the second candidate datasets are obtained by querying a vector database and analyzing results.

Various types of metadata can be utilized by a dataset relation exploration system of the present disclosure. In some examples, for each dataset of the plurality of datasets, the metadata comprises at least one of a dataset name, a dataset description, a dataset type, a dataset version, one or more dataset columns, a user profile associated with the dataset, a system process associated with the dataset, or a tag associated with the dataset. Furthermore, in some examples, a metadata embedding is generated for a particular dataset by processing at least some of its specific metadata to obtain a numerical or vector representation thereof, thereby capturing semantic meaning or context associated with the dataset.

In some examples, after the two sets of candidates have been generated, prompt data is generated. In some examples, the prompt data identifies the first candidate datasets and the second candidate datasets, and includes an instruction to select the related datasets from among the first candidate datasets and the second candidate datasets. The method may include using a machine learning model, such as a language model, to process the prompt data to generate output.

Features of the language model may be leveraged by dynamically and automatically generating prompt data according to a predetermined prompt structure. For example, the method includes dynamically generating the prompt data to provide the instruction to the language model, including at least a first instruction segment, a second instruction segment, and a third instruction segment. The first instruction segment is to analyze context data associated with the target dataset, the first candidate datasets, and the second candidate datasets. The second instruction segment is to select, as the related datasets, a plurality of most relevant datasets from among the first candidate datasets and the second candidate datasets based on the analyzing of the context data. The third instruction segment is to generate the output in a structured format that includes the related datasets and descriptions of the relationships among the target dataset and the related datasets.

The method may further include generating, based on the output of the machine learning model, a visual representation of relationships among the target dataset and the related datasets. The method may further include causing presentation of the visual representation in a user interface at the user device.

In some examples, the visual representation includes a relationship graph. The relationship graph may include respective objects representing the target dataset and the related datasets, as well as object connections representing the relationships among the target dataset and the related datasets. In some examples, the respective objects are user-selectable via the user interface to cause adjustment or updating of the visual representation.

In examples in the present disclosure, a user can interact with visual representations generated by the dataset relation exploration system in various ways. For example, a user can view additional data related to a dataset, view the contents of a dataset itself (e.g., "open" the dataset), or create custom relationships between datasets. In some examples, the user is enabled to filter data included in the visual representation to obtain customized or personalized representations.

Examples described herein provide one or more technical solutions to technical problems. By incorporating semantic understanding into a dataset relation exploration system, technical challenges associated with strict keyword-based matching systems can be addressed or alleviated. As an example, a search for "bike sales" may not return results for a dataset titled "bicycle revenue" even though they are semantically equivalent. Examples in the present disclosure address this technical challenge through semantic matching operations. The system can thus find relevant datasets when their respective names or descriptions carry similar meanings, while being expressed (textually) differently within a database.

A computing system can be enabled to handle complex business requirements by providing categorized relationships, thereby offering a streamlined solution to understanding and finding data. Examples described herein enable more efficient data exploration where a target dataset has a group of related datasets that cannot easily be found using a simple query, particularly when relations are based on varying or complex factors.

In some examples, the need for a user to attempt to fetch relevant results one-by-one is obviated by addressing technical constraints that hinder a system's ability to quickly identify and retrieve interconnected data within large repositories. In some examples, this is achieved by automatically comparing metadata of the target dataset with metadata of other datasets to identify first candidate datasets, automatically comparing metadata embeddings to identify second candidate datasets, and then using a language model to automatically select the most relevant datasets from among these candidates.

Examples described herein improve the functioning of a computing system by enhancing data discovery efficiency and accuracy. In some examples, the computing system automates the process of identifying related datasets by leveraging metadata comparisons, embedding techniques, and language model processing. This approach allows for simultaneous identification of multiple related datasets, reducing the time and computational resources that are used when compared, for instance, to traditional one-by-one search methods. Additionally, the use of metadata embeddings and language model processing enables accurate and context-aware dataset discovery, improving the quality and relevance of results in large data repositories.

When the effects in this disclosure are considered in aggregate, one or more of the methodologies described herein may obviate a need for certain efforts or resources that otherwise would be involved in data exploration. Computing resources utilized by systems, databases, or networks may be more efficiently utilized or reduced, e.g., as a result of the automated identification of related datasets, the simultaneous processing of multiple datasets, and the intelligent semantic understanding facilitated by generative artificial intelligence (AI). Furthermore, the computing system may be enabled to perform complex relationship analysis and generate visual representations of dataset relationships, thereby reducing the need for manual data exploration and analysis, potentially saving significant time and computational resources. Moreover, the customization and sharing capabilities of the system may reduce redundant efforts across different users or teams working with the same data repositories. Examples of computing resources that can be more efficiently utilized or reduced may include processor cycles, network traffic, memory usage, graphics processing unit (GPU) resources, data storage capacity, power consumption, or cooling capacity.

FIG. 1 is a diagrammatic representation of a networked computing environment 100 in which some examples of the present disclosure may be implemented or deployed. One or more servers in a server system 104 provide server-side functionality via a network 102 to a networked device, in the example form of a user device 106 that is accessed by a user 108. A web client 112 (e.g., a browser) or a programmatic client 110 (e.g., an "app") may be hosted and executed on the user device 106.

An Application Program Interface (API) server 128 and a web server 130 provide respective programmatic and web interfaces to components of the server system 104. An application server 126 hosts a dataset relation exploration system 132, which includes components, subsystems, modules, or applications.

The user device 106 can communicate with the application server 126, such as via the web interface supported by the web server 130 or via the programmatic interface provided by the API server 128. It will be appreciated that, although only a single user device 106 is shown in FIG. 1, a plurality of user devices may be communicatively coupled to the server system 104 in some examples. Further, while certain functions may be described herein as being performed at either the user device 106 (e.g., web client 112 or programmatic client 110) or the server system 104, the location of certain functionality either within the user device 106 or the server system 104 may be a design choice.

The application server 126 is communicatively coupled to database servers 138, facilitating access to one or more information storage repositories, such as one or more databases 140. In some examples, the database 140 includes storage devices that store information to be processed by the dataset relation exploration system 132. In some examples, the server system 104 includes or is coupled with multiple different data sources, which can include multiple different databases.

The application server 126 accesses application data (e.g., application data stored by the database servers 138) to provide one or more applications or software tools to the user device 106 via a web interface 116 or an app interface 114. As described further below according to examples and with specific reference to FIG. 2 to FIG. 10, the application server 126, using the dataset relation exploration system 132, may provide one or more tools or functions for dataset relation exploration.

In some examples, the dataset relation exploration system 132 enables users to efficiently navigate through large data repositories, discover related datasets, and visualize dataset relationships in an intuitive format. The dataset relation exploration system 132 may address the limitations of traditional keyword-based search methods by incorporating semantic understanding and providing a more comprehensive view of dataset relationships. To this end, and as shown in FIG. 1, the application server 126 may include both an extraction subsystem 134 and an exploration subsystem 136.

The extraction subsystem 134 is responsible for extracting metadata and generating embedding results. In some examples, the extraction subsystem 134 allows users to add specified data sources and manage the extraction of metadata. A metadata service extracts metadata from datasets, which may include various metadata items, such as the dataset's name, description, type, or columns. The metadata is stored for querying by the exploration subsystem 136. An embedding service processes the extracted metadata and stores the embedding results for querying by the exploration subsystem 136.

The exploration subsystem 136 facilitates exploration of datasets and the relationships between datasets. In some examples, the exploration subsystem 136 offers comprehensive relationship visualization and exploration functionalities. For example, users can observe related objects for a specified dataset, customize relationships between datasets, and consolidate groups of relationships for saving or sharing. In some examples, the exploration subsystem 136 synthesizes technical candidate datasets and semantic candidate datasets to perform comprehensive relationship analysis.

The dataset relation exploration system 132 may provide various user interfaces (e.g., graphical user interfaces provided via the app interface 114 or web interface 116). User interfaces may include a search user interface that allows a user to identify an initial target dataset and an exploration user interface that allows the user to explore or customize relationships relevant to the target dataset. In some examples, the user interfaces include an extraction user interface that allows the user to identify, select, or upload data sources, thereby causing the dataset relation exploration system 132 to extract metadata from datasets within those data sources.

In some examples, the application server 126 is part of a cloud-based platform provided by a software provider that allows the user 108 to utilize the tools of the dataset relation exploration system 132. For example, the user 108 might be an account holder that accesses the dataset relation exploration system 132 via suitable credentials to use the features of the extraction subsystem 134 or the exploration subsystem 136.

One or more of the application server 126, the database servers 138, the API server 128, the web server 130, and the dataset relation exploration system 132 may each be implemented in a computer system, in whole or in part, as described below with respect to FIG. 13. In some examples, external applications (which may be third-party applications or applications outside of the server system 104 provided by the software provider), such as external application 118 provided via an external server 120, can communicate with the application server 126 via the programmatic interface provided by the API server 128. For example, a third-party application may support one or more features or functions on a website or platform hosted by a third party, or may perform certain methodologies and provide input or output information to the application server 126 for further processing or publication.

The server system 104 may include an AI system 142 that provides AI functionality. For example, the AI system 142 can communicate with the dataset relation exploration system 132 to provide access to trained machine learning models, to facilitate training or retraining of machine learning models, to process or access training data, or to provide access to externally hosted machine learning tools, such as one or more machine learning model(s) 122 accessible via an external server 124.

In some examples, the AI system 142 allows the dataset relation exploration system 132 to access and utilize generative AI functionality. For example, the AI system 142 allows the dataset relation exploration system 132 to leverage features of a generative model, such as the machine learning model(s) 122 at the external server 124. In other examples, the generative model is hosted locally at the server system 104 (e.g., as part of the AI system 142), and the architecture shown in FIG. 1 is merely an example.

In some examples, the generative model is or includes a machine learning model known as a "language model." A language model that contains a significant number of parameters (e.g., in excess of a billion) may be known as a "Large Language Model," or "LLM." A language model such as an LLM may include a computational model developed for the tasks of processing, generating, and understanding human language. It employs machine learning methodologies, including deep learning architectures. The training of an LLM may utilize comprehensive training data, such as vast data sets of textual content, to enable the LLM to recognize patterns in language or other text. The LLM may be built upon a neural network framework, such as the transformer architecture (e.g., a transformer-based LLM).

A processing engine (e.g., at the AI system 142 or the external server 124) may handle certain preprocessing of data before sending it to the generative model, and certain post-processing of the responses received from the generative model. For preprocessing, the processing engine may tokenize, compress, or format the data to optimize it for the generative model. For post-processing, it may format the response, perform detokenization or decompression, and prepare the response for sending back to a requesting system.

In some examples, a generative AI model, such as an LLM, is fine-tuned on tasks relating to a specific use case to improve its ability to provide useful or accurate results. For example, a model may be fine-tuned to identify and explain (e.g., describe) relationships between different datasets. The model might, for instance, be fine-tuned using pairs of training data, where each pair includes input data describing a target dataset as well as multiple other datasets. and corresponding output data in which a subset of most relevant datasets is selected from the input data (e.g., including descriptions of the relationships between each relevant data and a target dataset). In other examples, the generative AI model is a pre-trained model, such as a pre-trained, transformer-based LLM.

The network 102 may be any network that enables communication between or among machines, databases, and devices. Accordingly, the network 102 may be a wired network, a wireless network (e.g., a mobile or cellular network), or any suitable combination thereof. The network 102 may include one or more portions that constitute a private network, a public network (e.g., the Internet), or any suitable combination thereof.

Figure 2:
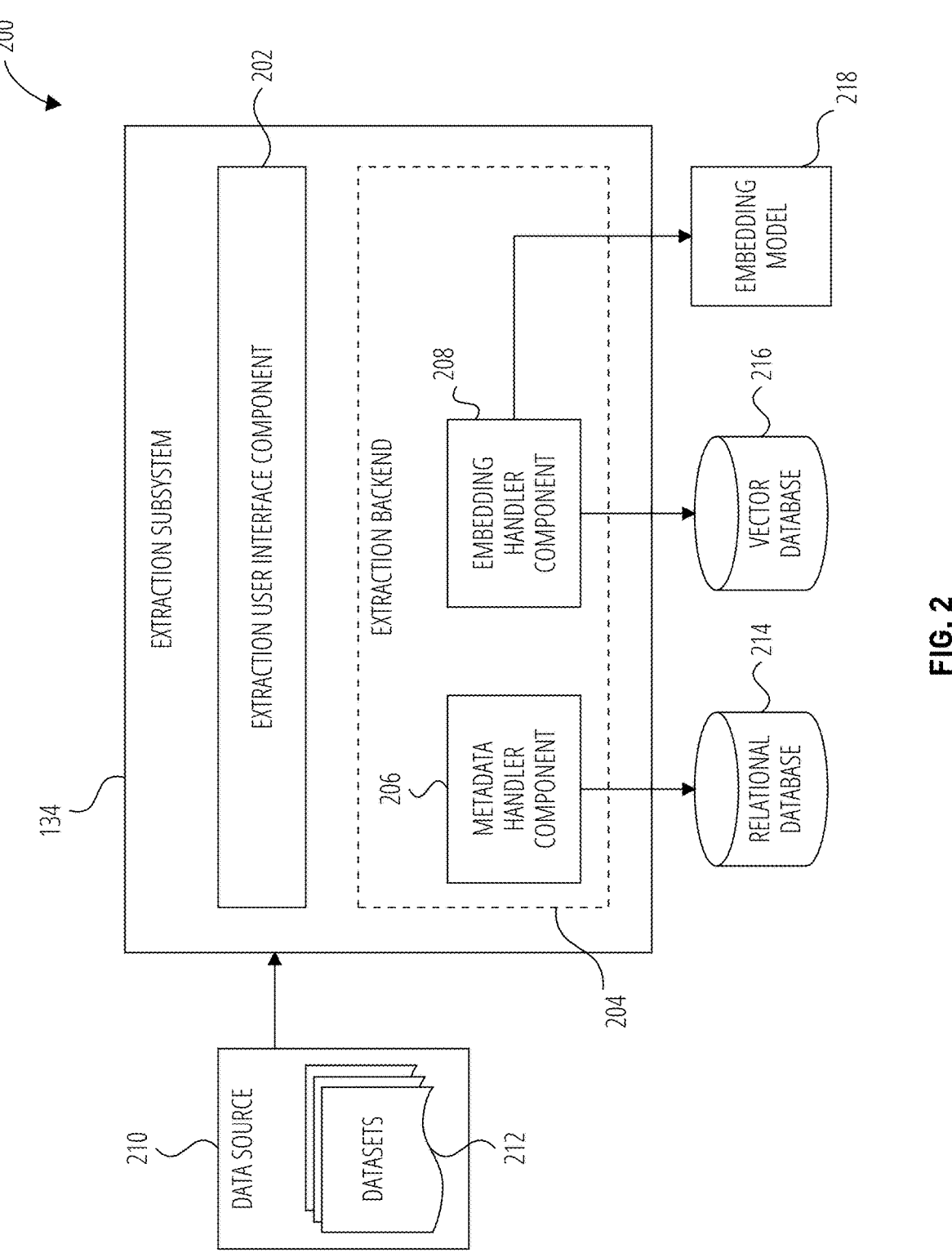
FIG. 2 is a diagrammatic representation of an extraction subsystem of a dataset relation exploration system, according to some examples.

FIG. 2 is a diagram 200 that illustrates the extraction subsystem 134 of the dataset relation exploration system 132 of FIG. 1, according to some examples. The extraction subsystem 134 is shown to include an extraction user interface component 202 and an extraction backend 204. The extraction backend 204 includes a metadata handler component 206 and an embedding handler component 208. FIG. 2 further shows a data source 210 that includes a plurality of datasets 212. In addition, FIG. 2 illustrates a relational database 214, a vector database 216, and an embedding model 218.

In some examples, the extraction user interface component 202 provides a user interface (e.g., a specific user interface page or multiple specific pages) that enables users to add specified data sources and manage metadata extraction. For example, the user 108 can access the extraction subsystem 134 via the user device 106 (e.g., using the web interface 116) and select the datasets 212 that are stored in the data source 210.

It is noted that while a single data source is shown in FIG. 2, multiple data sources can be accessed to select the datasets 212 in other examples. For example, the user 108 might select one or more tables from each of multiple data sources for extraction and subsequent analysis.

The datasets 212 are, for example, respective tables, views, files, other data containers or structures, or combinations thereof. The datasets 212 may contain structured or unstructured data and can vary in size, complexity, and format. For instance, a dataset may include multiple attributes or columns that define its structure and content. For example, a customer dataset contains attributes such as customer identifier (ID), name, email, and phone number. The datasets 212 may be stored in various types of data repositories, such as data warehouses, data lakes, or other storage systems. The datasets 212 have associated metadata, including descriptions, tags, details of their columns or attributes, details of their creators or systems they are associated with, version information, or other features that can be used for categorization, searching, and management purposes.

The extraction backend 204 communicates with the extraction user interface component 202, for example, to act on and respond to user requests. Specifically, the extraction backend 204 is responsible for extracting metadata and generating metadata embedding results.

The metadata handler component 206 is responsible for extracting metadata of each of the datasets 212. In some examples, the metadata handler component 206 receives an indication of the selected datasets 212, extracts the metadata associated with those datasets 212, and stores the metadata in the relational database 214. The metadata of each of the datasets 212 can be stored in association with a respective identifier of that dataset to facilitate subsequent access or retrieval.

The embedding handler component 208 is responsible for generating or obtaining a metadata embedding for each of the datasets 212. In some examples, the metadata embedding is created from the metadata that is stored for the specific dataset within the relational database 214 (e.g., the metadata that was initially extracted by the metadata handler component 206).

The embedding handler component 208 may communicate with the metadata handler component 206 to obtain the relevant metadata for each of the datasets 212. Alternatively, or additionally, the embedding handler component 208 may communicate with the extraction user interface component 202 to obtain the relevant metadata.

In some examples, the embedding handler component 208 processes the metadata using a machine learning model to generate an embedding. An "embedding," as used herein, may include a numerical or vector representation of data. In some examples, the data is represented in a multi-dimensional vector space. The embedding may include a vector or a set of vectors used to represent the relevant input data. Embeddings can be generated by processing input data through the machine learning model to create dense vector representations. For example, an embedding provides a numerical representation of text input, providing a way to encode textual data into a format that captures the semantic meaning of the text.

The machine learning model may be the embedding model 218 depicted in FIG. 2. The embedding model 218 may be a dedicated embedding model, such as a trained text-to-embedding model, also referred to simply as a "text embedding model." A text embedding model is designed and trained to convert textual data into embeddings. Such embeddings are numerical data that capture the semantic meaning and contextual relationships of textual data. Text embedding models typically utilize neural network architectures. In some examples, a text embedding model can include a tokenizer that breaks down input text into smaller units (tokens), one or more embedding layers to converts tokens into initial vector representations, one or more transformer layers to process embeddings through self-attention mechanisms and feed-forward networks, and/or one or more pooling layers to aggregate token-level representations into a single vector for the entire input.

A text embedding model may produce, for example, a fixed-size vector (e.g., 200, 300, 768, or 1024 dimensions) representing the input, irrespective of the input size. A text embedding model can be trained in various ways. The training objective is typically to minimize the distance between semantically similar text in the embedding space while maximizing the distance between dissimilar ones. Training techniques can include unsupervised pre-training, supervised fine-tuning, contrastive learning, or combinations thereof.

In some examples, an embedding can be obtained by leveraging a pre-trained language model, such as a pre-trained LLM. For instance, hidden layer output of a pre-trained LLM can be extracted to obtain an embedding representing text that was provided as input to the pretrained LLM. In this way, the LLM's learned representations of language are utilized to create a compact, meaningful representation of the input data. The model typically processes the input text through layers, with the hidden layer outputs, e.g., from a last layer, contain rich contextual information about the input text. The resulting embedding may be a fixed-size vector (e.g., 768 or 1024 dimensions, depending on the model) that represents the input in a high-dimensional space.

In the context of the metadata embedding that is generated or obtained by the embedding handler component 208, the metadata embedding can be created from various aspects of a dataset, including its name, description, or other metadata elements, as discussed elsewhere. These embeddings capture semantic information about the dataset in a format that allows for efficient comparison and similarity calculations. For example, the embedding of a dataset titled "Q3 Sales Report" might be numerically similar to the embedding of a dataset named "Third Quarter Revenue Summary," even though the exact words that were used to generate the embeddings differ.

Figure 3:
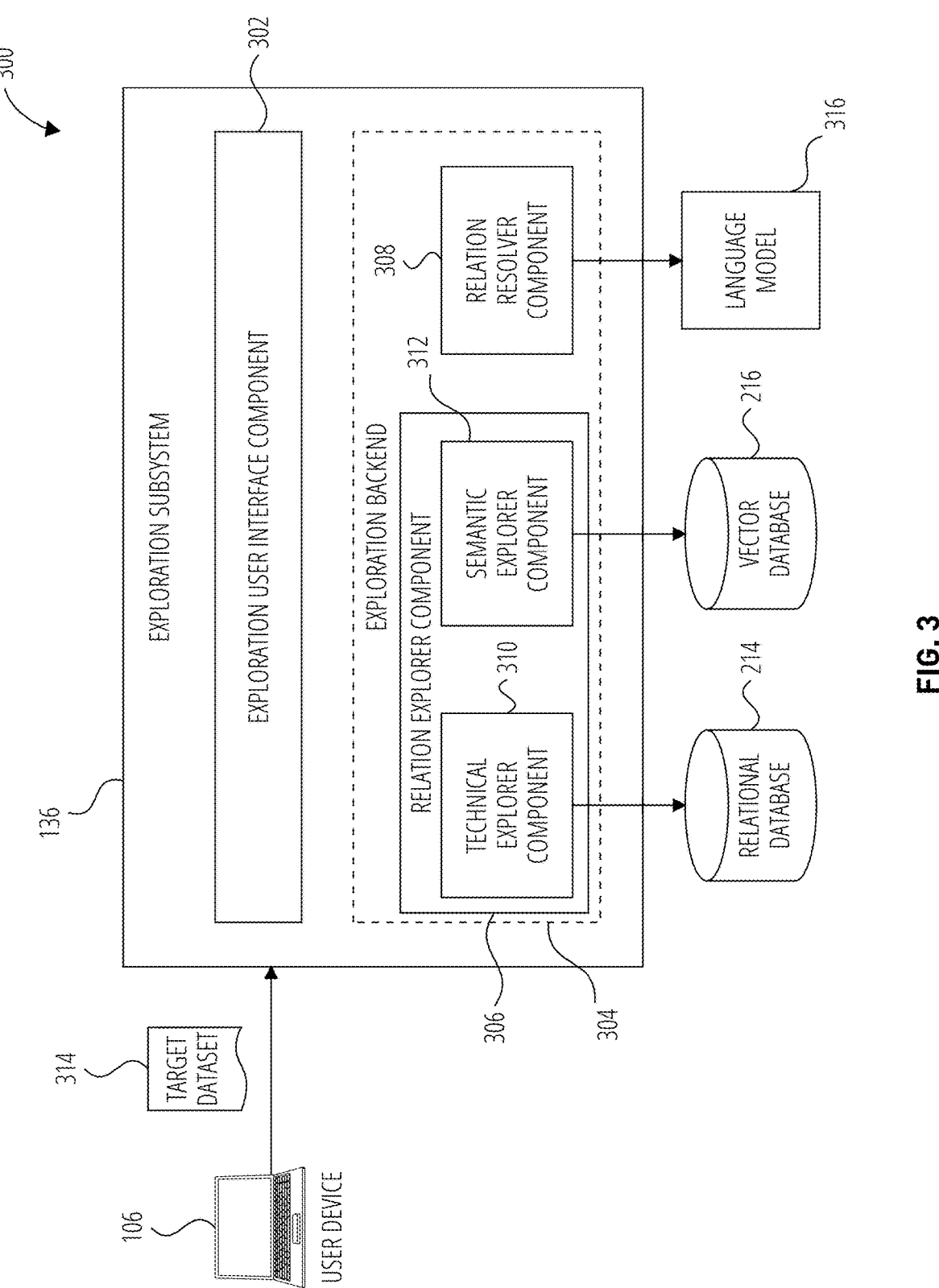
FIG. 3 is a diagrammatic representation of an exploration subsystem of a dataset relation exploration system, according to some examples.

FIG. 3 is a diagram 300 that illustrates the exploration subsystem 136 of the dataset relation exploration system 132 of FIG. 1, according to some examples. The exploration subsystem 136 is shown to include an exploration user interface component 302 and an exploration backend 304. The exploration backend 304 includes a relation explorer component 306 and a relation resolver component 308. The relation explorer component 306 includes a technical explorer component 310 and a semantic explorer component 312.

FIG. 3 further shows the user device 106 of FIG. 1 and illustrates a target dataset 314 that is selected by the user 108 of the user device 106. The target dataset 314 is, for example, one of the datasets 212 of FIG. 2 (e.g., the user 108 wishes to explore related datasets for the specific target dataset 314). In addition, FIG. 3 illustrates the relational database 214 and the vector database 216 of FIG. 2, and a language model 316 (e.g., an LLM) that is used by the relation resolver component 308.

In some examples, the exploration user interface component 302 provides a user interface (e.g., a specific user interface page or multiple specific pages) that enables users to select target datasets, view relations between datasets, create custom dataset relations, and so forth. For example, the user 108 can access the exploration subsystem 136 via the user device 106 (e.g., using the web interface 116) and select the target dataset 314 for exploration.

Accordingly, in some examples, through the exploration user interface component 302, the dataset relation exploration system 132 provides object relationship visualization and object exploration functionalities. The datasets analyzed by the user 108 may include datasets from the same creator or those having similar attributes or metadata. Additionally, a group of relationships can be consolidated for saving or sharing with other users.

The relation explorer component 306 is responsible for retrieving or identifying datasets that are related, or possibly related, to the target dataset 314. The relations may be technical or semantic. For example, technical relations can include datasets from the same creator, datasets with identical columns, or datasets with related lineage, while semantic relations can include similar semantics, contrasting semantics, or related semantics.

To this end, the technical explorer component 310 is configured to use the metadata in the relational database 214 to perform retrieval and to execute search scenarios. The technical explorer component 310 is configured to identify one or more candidate datasets that are potentially related to the target dataset 314. The candidate datasets may be referred to as "technical candidates" in examples where the technical explorer component 310 performs technical matching to identify them. In some cases, datasets may be interconnected through common attributes or relationships, allowing for joins or associations between them. For example, an "Order" dataset may be related to a "Customer" dataset through a common customer ID attribute.

For example, the technical explorer component 310 is configured to identify column-based candidates, where datasets that can be associated with the current table based on common columns are found, or data lineage-based candidates, finding datasets corresponding to parent nodes, ancestors, sibling nodes, or child nodes of the current node (e.g., the target dataset 314 is regarded the current node). As further examples, the technical explorer component 310 can identify tag-based hierarchy candidates or user profile-based candidates (e.g., datasets with the same creator). In some examples, technical matches provide a foundation for understanding how datasets are structurally related within a data management system.

The semantic explorer component 312 is configured to use the metadata embeddings stored in the vector database 216 to perform semantic retrieval and analysis for data. For instance, a dataset titled "Annual Revenue Report" might be semantically matched with a dataset named "Yearly Income Summary" due to the similarity in their underlying concepts, despite using different terminology and despite no technical match existing based on the operations of the technical explorer component 310. Semantic matching may rely on advanced natural language processing techniques and machine learning algorithms to generate and compare embeddings. This approach allows for more nuanced and context-aware dataset discovery, potentially surfacing relevant datasets that might be overlooked by traditional keyword-based or structural matching methods.

Accordingly, the semantic explorer component 312 is also configured to identify one or more candidate datasets that are potentially related to the target dataset 314. The candidate datasets may be referred to as "semantic candidates" where the semantic explorer component 312 uses semantic analysis to identify them. In some examples, there might be at least some overlap between a set of technical candidates and a set of semantic candidates.

The relation resolver component 308 is configured to synthesize the candidates generated by the technical explorer component 310 (e.g., the technical candidates) and the candidates generated by the semantic explorer component 312 (e.g., the semantic candidates), and to perform comprehensive relationship analysis to understand how the candidate datasets relate to each other and to the target dataset 314. Based on input received from both the technical explorer component 310 and the semantic explorer component 312, the relation resolver component 308 is responsible for generating or obtaining a set of related datasets (e.g., a subset of the candidate datasets) associated with the specific target dataset 314.

The relation resolver component 308 may be configured to use generative AI features to obtain a final result (e.g., the related datasets). For example, the relation resolver component 308 dynamically generates prompt data that is processed by the language model 316 to generate output. The output can include the related datasets and other information to be presented to the user 108, such as descriptions of the relationships between the datasets. Examples related to the generation, content, and handling of the prompt data are provided elsewhere in the present disclosure.

In some examples, the relation resolver component 308 is responsible for generating the output in a predetermined format, and to return the output to the exploration user interface component 302 for generation of user output. The relation resolver component 308 may run a post-processing component that handles the returned results from the language model 316 and ultimately converts them into a specified format to be returned to the exploration user interface component 302.

In some examples, the exploration user interface component 302 causes presentation of a relationship graph at the user device 106. The relationship graph may include a visual representation of interconnections between datasets. The relationship graph may include nodes representing individual datasets and edges representing the relationships or associations between them. In some examples, the relationship graph is interactive and has user-selectable elements, allowing users to explore and navigate the connections between datasets visually. For example, the user 108 can click on (or otherwise select) nodes to view dataset details, filter relationships by type, or adjust the number of displayed connections. Additionally, the relationship graph generated by the exploration user interface component 302 may support customization, enabling users to add, edit, or remove relationships based on their domain knowledge or specific business needs.

In some examples, at least some of the components shown in FIG. 2 or FIG. 3 are configured to communicate with each other to implement aspects described herein. One or more of the components described herein may be implemented using hardware (e.g., one or more processors of one or more machines) or a combination of hardware and software. For example, a component described herein may be implemented by a processor configured to perform the operations described herein for that component. Moreover, two or more of these components may be combined into a single component, or the functions described herein for a single component may be subdivided among multiple components.

Furthermore, according to various examples, components described herein may be implemented using a single machine, database, or device, or be distributed across multiple machines, databases, or devices.

Figure 4:
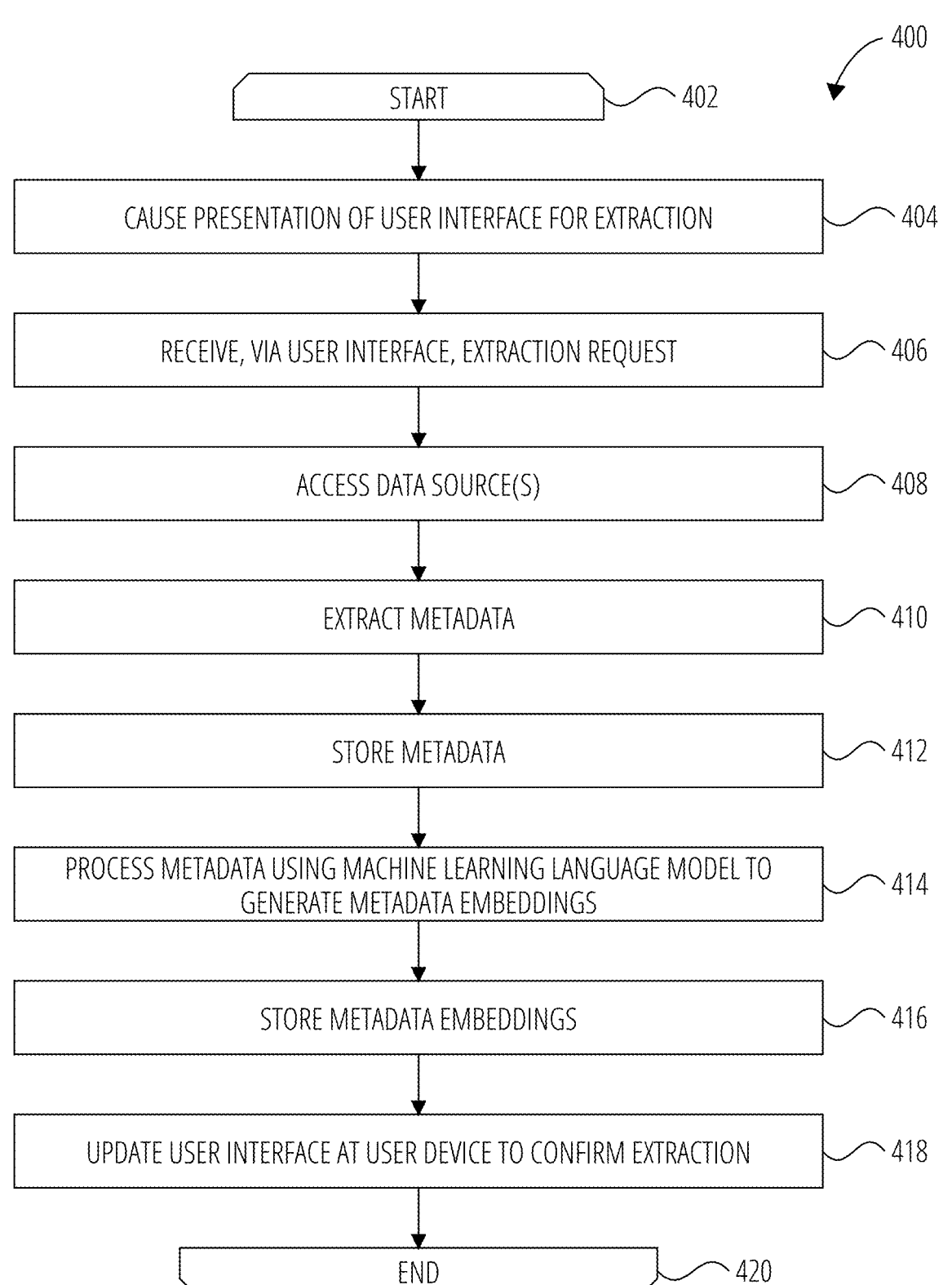
FIG. 4 is a flowchart illustrating operations of a method for extracting metadata, generating metadata embeddings, and storing the metadata and the metadata embeddings for use within a dataset relation exploration system, according to some examples.

FIG. 4 is a flowchart illustrating operations of a method 400 for extracting metadata, generating metadata embeddings, and storing the metadata and metadata embeddings for use in the context of the dataset relation exploration system 132, according to some examples. By way of example and not limitation, aspects of the method 400 may be performed by the components, devices, systems, network, or databases shown in FIG. 1 to FIG. 3.

At a high level, the method 400 involves adding datasets from one or multiple data sources to be processed by the dataset relation exploration system 132, extracting metadata from the datasets, and computing embedding results of the extracted metadata to provide semantic understanding capabilities within the context of the dataset relation exploration system 132. The method 400 starts at opening loop operation 402 and proceeds to operation 404, where the extraction user interface component 202 causes presentation of a user interface, such as an extraction user interface that allows the user to identify, select, or upload data sources.

The user 108 uses the user interface to select or add one or more data sources. For example, the user 108 selects one or more relational databases or one or more Hadoop Distributed File Systems as the data sources. In some examples, the user 108 can make more granular selections, such as selecting specific datasets (e.g., specific tables or views) within a data source instead of selecting the entire data source. Once the user 108 has finished selecting or adding the one or more data sources, the extraction user interface component 202 receives an extraction request at operation 406.

The dataset relation exploration system 132 then accesses the relevant data source, or data sources, to extract metadata from the datasets in each data source (operation 408 and operation 410). For example, the metadata handler component 206 is implemented using an automated metadata service that calls corresponding interfaces of each data source to retrieve source data for persisting into the relational database 214. Examples of the metadata that can be extracted and stored in the relational database 214 are dataset name, description, type, version, columns, tag, or creator details.

The metadata for each dataset are stored in the relational database 214 at operation 412. This allows the exploration subsystem 136 of the dataset relation exploration system 132 to subsequently query the relational database 214 to analyze the metadata of different datasets (e.g., to compare the metadata of a target dataset with the metadata of other datasets).

The method 400 proceeds to operation 414, where the dataset relation exploration system 132 processes the metadata extracted for each dataset to generate a metadata embedding for each respective dataset. For example, the embedding handler component 208 is implemented using an embedding service that invokes the embedding model 218 to automatically compute embedding results for all relevant sets of metadata.

The embedding handler component 208 receives the embedding results and stores the metadata embeddings in the vector database 216 at operation 416. This allows the exploration subsystem 136 to subsequently query the vector database 216 to analyze the metadata embeddings of different datasets (e.g., to compare the metadata embedding of a target dataset with the metadata embeddings of other datasets comprises).

At operation 418, the extraction user interface component 202 updates the user interface presented at the user device 106. For example, the user interface is updated to indicate to the user 108 that the relevant datasets have been added, and that extraction and processing have been completed to enable subsequent data exploration. The method 400 concludes at closing loop operation 420.

Figure 5:
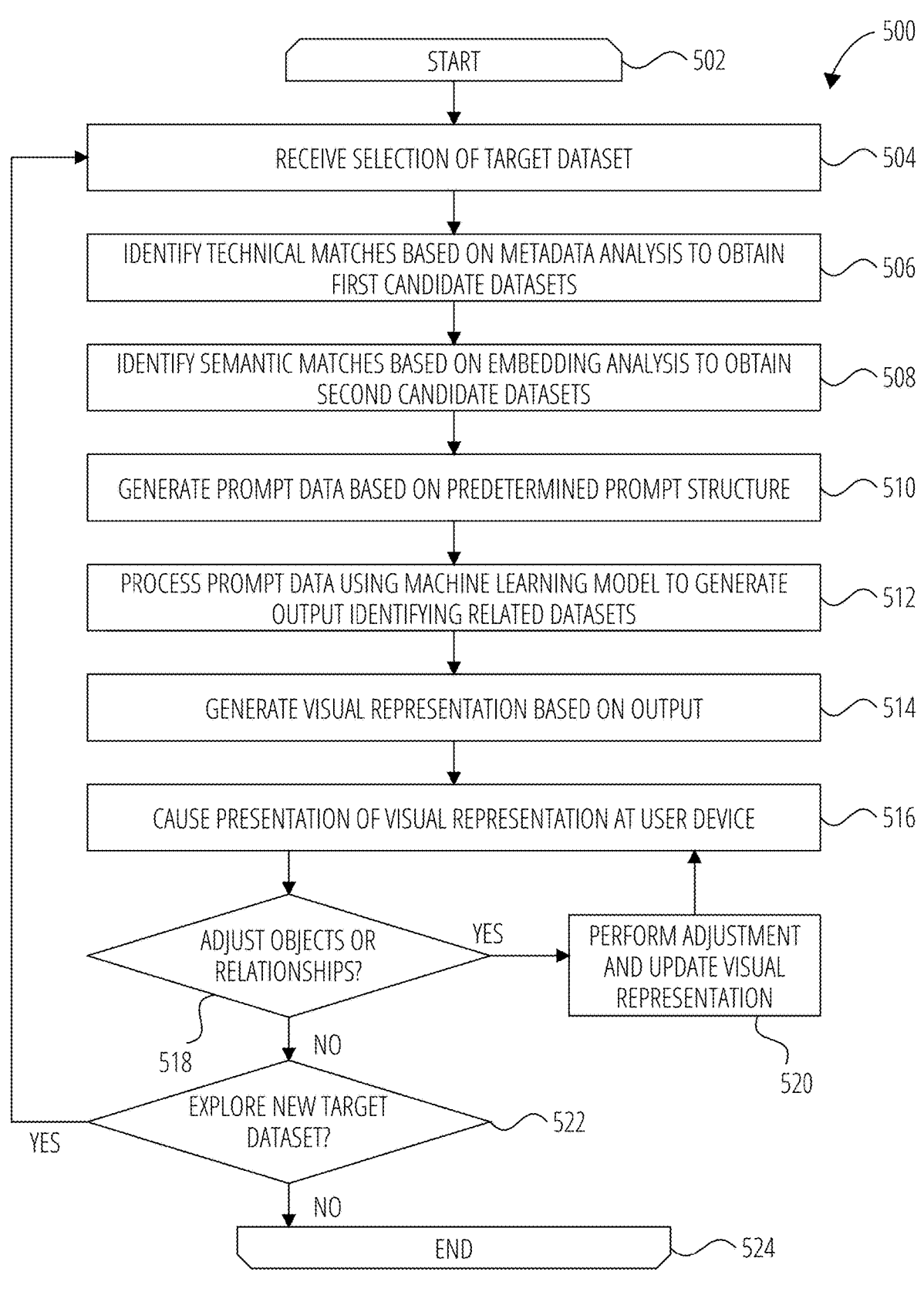
FIG. 5 is a flowchart illustrating operations of a method for facilitating the exploration of relationships between datasets, according to some examples.

FIG. 5 is a flowchart illustrating operations of a method 500 for facilitating the exploration of relationships between datasets, according to some examples. By way of example and not limitation, aspects of the method 500 may be performed by the components, devices, systems, network, or databases shown in FIG. 1 to FIG. 3.

The method 500 may involve exploring technical candidates and semantic candidates corresponding to a target dataset. In some examples, the dataset relation exploration system 132 utilizes analytical and inferential capabilities of a language model, such as an LLM, to generate related datasets.

The method 500 starts at opening loop operation 502 and proceeds to operation 504, where the dataset relation exploration system 132 receives a selection of a target dataset. For example, the user 108 performs a keyword search and the dataset relation exploration system 132 presents search results in a user interface. From the search results, the user 108 selects a particular dataset as the target dataset (e.g., the target dataset 314 of FIG. 3).

At operation 506, the dataset relation exploration system 132 automatically identifies technical matches for the target dataset by performing metadata analysis. For example, the technical explorer component 310 takes, as input, an identifier of the target dataset, accesses the relational database 214, and compares the metadata of the target dataset with the metadata of the other datasets in the relational database 214 to identify the technical matches.

Operation 506 yields first candidate datasets that may be referred to as technical candidates. During operation 506, the technical explorer component 310 may match the target dataset with other datasets based, for example, on a common attribute, a common data label, a common user profile attribute, or a data lineage relationship. Examples are discussed below:

Column-based technical candidates: For example, if the current dataset is a table, based on its column information, all other datasets that can be associated with the current table can be found by the technical explorer component 310 (e.g., where association refers to joins in a database).

Data lineage-based technical candidates: For example, if the target dataset is a view, based on its lineage information, all datasets corresponding to the current node's parent nodes, ancestors, sibling nodes, and child nodes can be found by the technical explorer component 310.

Tag-based hierarchy technical candidates: For example, if the target dataset has a certain tag, all other datasets with the same tag can be found by the technical explorer component 310.

User profile-based candidates: For example, based on the creation time of the target dataset, all other datasets created simultaneously or within a predetermined time window can be found by the technical explorer component 310.

At operation 508, the dataset relation exploration system 132 automatically identifies semantic matches (e.g., the top semantic matches) based on embedding analysis. For example, the semantic explorer component 312 takes, as input, an identifier of the target dataset, accesses the vector database 216, and compares the metadata embedding of the metadata embedding of the target dataset with the metadata embeddings of the other datasets in the vector database 216. The dataset relation exploration system 132 then selects the most similar other datasets based on embedding value similarities.

In this way, the semantic explorer component 312 identifies candidates that are the best matches from a semantic perspective. The semantic explorer component 312 may be configured to return only a predetermined number of semantic candidates (e.g., no more than 10, 20, 30, 50, or 100).

In some examples, the semantic explorer component 312 not only addresses strict semantic similarities, but also other semantic relations in order to identify the top semantic matches. For example, the semantic explorer component 312 can include, in its list of top semantic matches, datasets based on semantic similarity (e.g., "bike" and "bicycle"), semantic opposites (e.g., "male" and "female"), semantic inclusion (e.g., "location" and "city"), or semantic relevance (e.g., "student" and "teacher"). Accordingly, in some examples, a "semantic match" does not only refer strictly to semantic similarity but also to other relations that can be detected using semantic analysis.

Operation 508 yields second candidate datasets that may be referred to as semantic candidates. It is noted that the first candidate datasets and the second candidate datasets may at least partially overlap (e.g., a particular dataset is included in the technical candidates and the semantic candidates). The first candidate datasets and the second candidate datasets can be generated sequentially or in parallel by the dataset relation exploration system 132.

The method 500 proceeds to operation 510, where the dataset relation exploration system 132 generates prompt data based on a predetermined prompt structure. In some examples, the relation resolver component 308 generates prompt data that identifies the target dataset, the first candidate datasets, and the second candidate datasets, and includes an instruction for generating a list of related datasets for the target dataset based on the input provided.

In some examples, the instruction is for the language model 316 to identify the "top-N" most relevant datasets, where "N" is a predetermined value, and to resolve the relations between each selected dataset and the target dataset. Accordingly, the relation resolver component 308 can use the language model 316 to accomplish two objectives: (1) determining the top-N most relevant datasets and (2) parsing the relationships between datasets.

Referring to objective (1), there may be many technical candidates and semantic candidates, with the related datasets to be selected being a subset of the overall number of candidates. Furthermore, the relationships between candidates and the target dataset vary in strength. Therefore, it may be desirable to find the top-N most relevant datasets from these candidate sets from a semantic perspective, combined with metadata information. Given the analytical and inferential capabilities of the language model 316 (e.g., LLM), the language model 316 can analyze the input data and provide a useful list of results.

Referring to objective (2), in addition to displaying the top-N most relevant datasets, describing the relationships between datasets is useful for understanding the output and further exploring the data. Again, given the analytical and inferential capabilities of the language model 316 (e.g., LLM), the language model 316 can analyze the input data and provide, for each result, a description of the relationship between that result and the target dataset.

The predetermined prompt structure can include a prompt template that is, at least in part, dynamically populated or assembled by the relation resolver component 308. The relation resolver component 308 may thus perform prompt building functions. In some examples, the prompt template includes a role segment, an instruction or task segment, an input segment (e.g., context data), and an output segment. Examples of these segments are discussed below:

Role segment: A description of the role that the language model 316 is to play in the task (e.g., the role of a data analyst).

Task or instruction segment: For example, the prompt data indicates that the language model 316 should (a) analyze context data associated with the target dataset, the first candidate datasets, and the second candidate datasets, (b) select a plurality of most relevant datasets from among the first candidate datasets and the second candidate datasets based on the analyzing of the context data, and (c) generate output that includes the related datasets and descriptions of the relationships among the target dataset and the related datasets.

Input segment: This segment may be populated with relevant context data, such as a list of the datasets to analyze, corresponding metadata, metadata matching results, and/or corresponding embedding results.

Output segment: A definition for the structured format to use when generating the output (e.g., a particular JavaScript Object Notation (JSON) or Extensible Markup Language (XML) format to use). As mentioned, the language model 316 can be instructed to provide a specific number of results, or no more than the specific number of results.

In some examples, the role segment, task segment, and output segment are pre-populated, while the relation resolver component 308 automatically injects the input segment into the prompt data in real-time, and passes the prompt data to the language model 316. At operation 512, the language model 316 processes the prompt data to generate the output.

The language model 316 may be enabled to understand the context and business scenario through several mechanisms. The language model 316 may receive comprehensive metadata about the target dataset and candidate datasets. The metadata provides context about the nature and purpose of each dataset. The language model 316 may also receive embedding information, allowing it to understand conceptual similarities that may not be apparent from simple keyword matching. Further information regarding the role and task of the language model 316 can provide additional context. Based on the inputs provided and the pre-trained capabilities of the language model 316 (e.g., "world knowledge" or "base knowledge" of an LLM, including pre-existing knowledge about data structures, business concepts, and data relationships), the language model 316 can consider both explicit and implicit relationships between datasets and identify those that are deemed to be most relevant to the target dataset.

The output generated by the language model 316 can include the list of related datasets, as well as short descriptions of the relevant relations. As mentioned, in some examples, the relation resolver component 308 can post-process the output from the language model 316, for example, to resolve raw output into final output that is in a format prescribed by the exploration user interface component 302.

At operation 514, the exploration user interface component 302 generates a visual representation based on the output, and causes presentation thereof at the user device 106 at operation 516. For example, the exploration user interface component 302 generates a graph or other visual representation that represents the relevant datasets and their interrelationships in the web interface 116 at the user device 106. The relationship graph may incorporate various types of relationships, such as column associations (where datasets share common attributes), tag associations (where datasets share common tags or categories), lineage associations (showing data flow or dependencies), semantic associations (based on content similarity or other semantic relations), or creator associations (linking datasets created by the same user or process).

The user 108 can conveniently and efficiently navigate and explore the datasets. At decision operation 518, the exploration subsystem 136 determines whether to adjust any objects or relationships presented at the user device 106. For example, the user 108 can provide input to create a custom relationship between two of the objects (e.g., datasets) shown in the user interface. If so, the dataset relation exploration subsystem 136 automatically adjusts the visual representation (e.g., by adding a new edge between two object nodes) operation 520, and the method 500 returns to operation 516 to present the updated visual representation.

If the user 108 does not wish to adjust objects or relationships in a current view, the method 500 may proceed to decision operation 522 where the exploration subsystem 136 determines whether a new target dataset is to be explored. For example, the user 108 can select one of the related datasets of the original target dataset to explore as a new target dataset. If so, the method 500 returns to operation 504, where the exploration subsystem 136 receives the selection of the new target dataset, performs technical and semantic matches for the new target dataset, and generates new results for presentation to the user 108 in the manner discussed above. In such a case, the visual representation is automatically updated to reflect the new results. If the user 108 does not wish to explore a new target dataset, the user 108 may select to exit the relevant user interface or application, and the method 500 concludes at closing loop operation 524.

FIG. 6 to FIG. 10 are user interface diagrams illustrating a user interface 602 as presented at a user device (e.g., the web interface 116 presented at the user device 106 of FIG. 1), according to some examples. The user interface 602 is an exploration user interface with different pages configured to allow a user (e.g., the user 108 of FIG. 1) to view, explore, or customize dataset relationships. In some examples, through specifically configured page interactions, the user can conveniently navigate and jump between datasets or relation views, thus efficiently and quickly finding the data they need.

Figure 6:
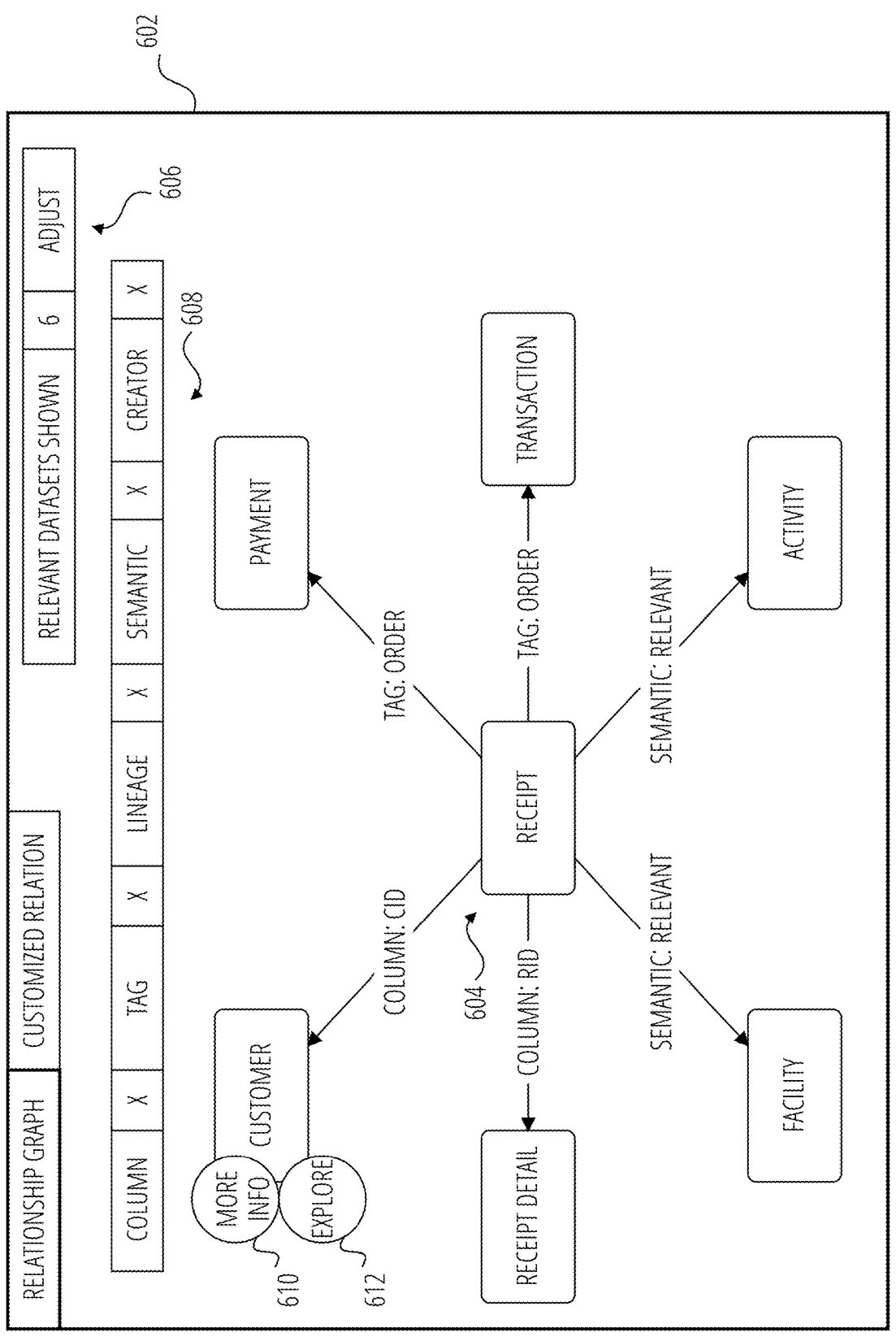
FIG. 6 is a user interface diagram illustrating a user interface as presented at a user device during a first stage, according to some examples.

At a first stage shown in FIG. 6, the user interface 602 shows a relationship graph for a target dataset 604. The target dataset 604 is the "Receipt" dataset. In the relationship graph, nodes (e.g., objects) represent datasets and edges (e.g., object connections) represent relationships.

The most relevant datasets to "Receipt," as determined by the dataset relation exploration system 132, are "Customer," "Payment," "Transaction," "Activity," "Facility," and "Receipt Detail," as shown in FIG. 6. In the example of FIG. 6, the user interface 602 shows only six related datasets, primarily for illustrative purposes. The number of related datasets shown may be based on a predetermined number specified in the instruction to the language model (e.g., the language model 316) and may also be adjusted based on a user selection, as indicated by an adjustment element 606 in the user interface 602.

The user interface 602 shows the relationship between the target dataset and each respective related dataset, as follows:

Receipt and Customer have a column-based relation based on a "CID" column (e.g., column ID).

Receipt and Payment have a tag-based relation based on a common tag, "Order."

Receipt and Transaction have a tag-based relation based on the common tag, "Order."

Receipt and Activity have a semantic relation based on a semantic match determined by the dataset relation exploration system 132.

Receipt and Facility have a semantic relation based on a semantic match determined by the dataset relation exploration system 132.

Receipt and Receipt Detail have a column-based relation based on a "RID" (e.g., receipt ID) column.

In the example of FIG. 6, four of the related datasets were revealed through technical matching while two of the related datasets were revealed through semantic matching. In some examples, the relationships as indicated in FIG. 6 are obtained from language model output. Since the relationship graph integrates relationship categories, this can be used for dataset filtering, as shown by the filters 608 in FIG. 6.

For example, the user can deselect the "tag" filter. This causes the dataset relation exploration system 132 to receive a filtering request with the selected filtering parameter (e.g., "tag"). In response, the dataset relation exploration system 132 generates an updated relationship graph by applying the filtering parameter, and causes presentation of the updated relationship graph (e.g., no longer including the Payment dataset and the Transaction dataset based on the removal of the "tag" category).

Figure 7:
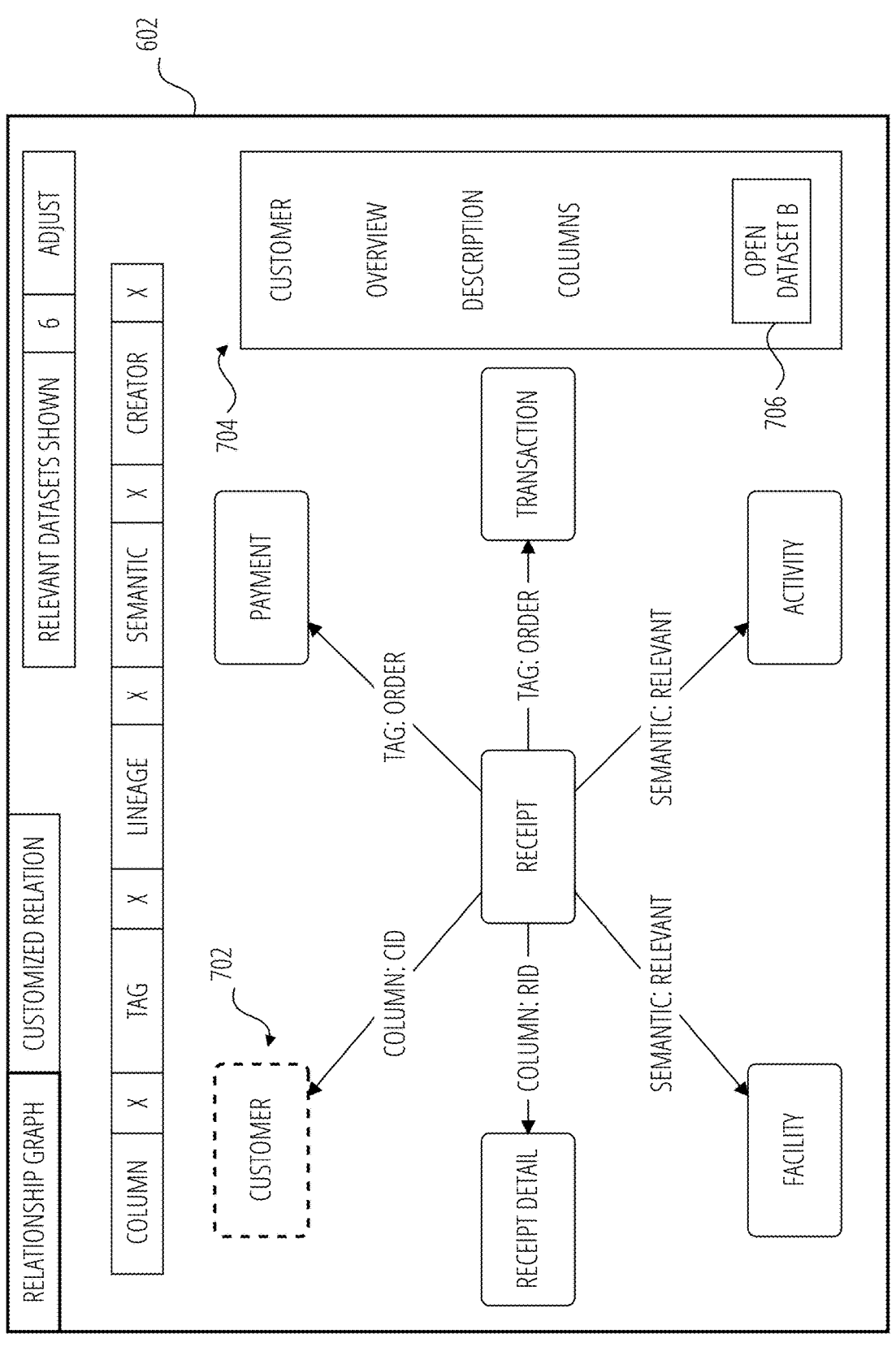
FIG. 7 is a user interface diagram illustrating the user interface of FIG. 6 as presented at the user device during a second stage, according to some examples.

At a second stage shown in FIG. 7, the user interface 602 shows the same relationship graph as in FIG. 6, but with the Customer dataset selected by the user, according to some examples. The Customer dataset is selected to access further information (see the selected dataset 702 that is indicated by dashed lines in FIG. 7).

The user can view additional data related to a dataset by selecting it. For example, the user selects a more info button 610 shown with the Customer dataset in FIG. 6, and in response to the selection thereof, the dataset relation exploration system 132 causes the user interface 602 to present an informational box 704 with details of the selected dataset 702, such as an overview, a description, and column information (e.g., in the case of a table).

From the informational box 704, the user can conveniently access the contents of the dataset itself by selecting an open dataset button 706 in the informational box 704. For example, if the user clicks on, or otherwise selects, the open dataset button 706, the dataset relation exploration system 132 automatically navigates the user to the actual dataset (e.g., it presents the actual Customer table in the web interface 116 instead of the relationship graph).

Thus, in some examples, after initial presentation of a visual representation in the user interface 602, the dataset relation exploration system 132 may receive a selection of one of the datasets. In response, the dataset relation exploration system 132 automatically causes presentation of additional data associated with the dataset together with the visual representation in the user interface.

Furthermore, the dataset relation exploration system 132 may automatically access a relevant data source (e.g., the data source 210 of FIG. 2) to retrieve data from the selected dataset 702. To present the full set of retrieved data, such as a full table or view, the dataset relation exploration system 132 may replace, within the user interface 602, the visual representation with the data retrieved from the data source.

Figure 8:
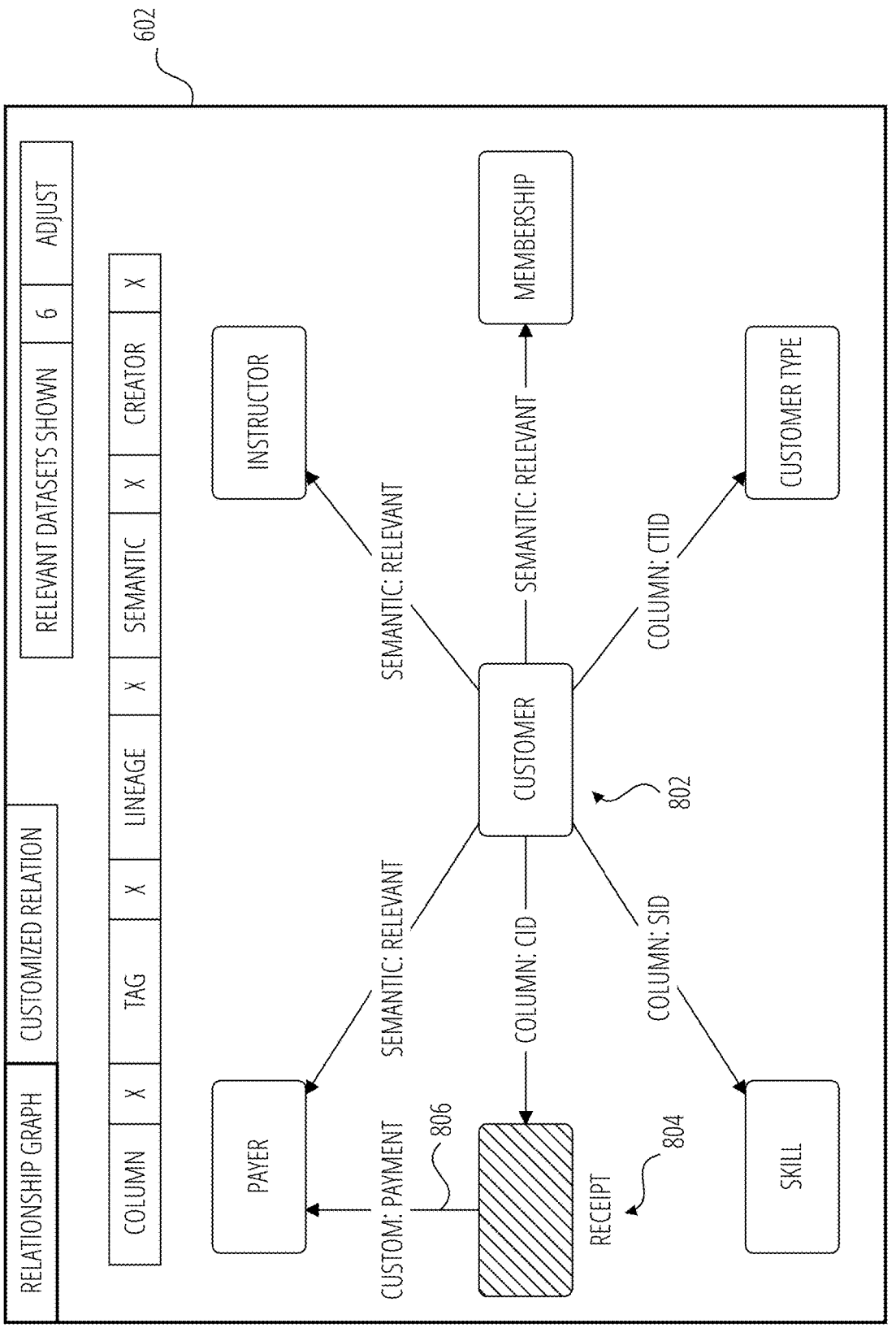
FIG. 8 is a user interface diagram illustrating the user interface of FIG. 6 as presented at the user device during a third stage, according to some examples.

At a third stage shown in FIG. 8, the user interface 602 shows an updated relationship graph, according to some examples. Specifically, after viewing the initial relationship graph of FIG. 6, the user selects the Customer dataset, which is initially shown as a related dataset, as a new target dataset. For example, the user selects an explore button 612 shown with the Customer dataset in FIG. 6.

The dataset relation exploration system 132 then generates an updated relationship graph in which the Customer dataset is the target dataset 802, and in which the related datasets for the Customer dataset are presented (as opposed to the related datasets for the Receipt dataset). In other words, the relationship graph automatically refreshes to show the related datasets and relationships with the Customer dataset as the starting point.

The updated relationship graph shows both the Customer dataset, which is the new target dataset 802, and the previous target dataset, Receipt. The dataset relation exploration system 132 automatically marks or highlights the Receipt dataset so as to visually distinguish it from the other related datasets, thereby indicating that it is a previous target 804. In this way, the user can easily trace their navigation history.

The user interface 602 also supports the editing of relations. As shown in FIG. 8, the user creates a custom relationship 806 between the Receipt dataset as and a Payer dataset. In the case of Receipt and Payer, for example, the dataset relation exploration system 132 did not indicate a relationship between them, and the user adds one manually. In some examples, in response to the user adding the custom relationship 806, the dataset relation exploration system 132 automatically persists the newly added relationship to storage (e.g., to the data source 210 or the relational database 214).

Figure 9:
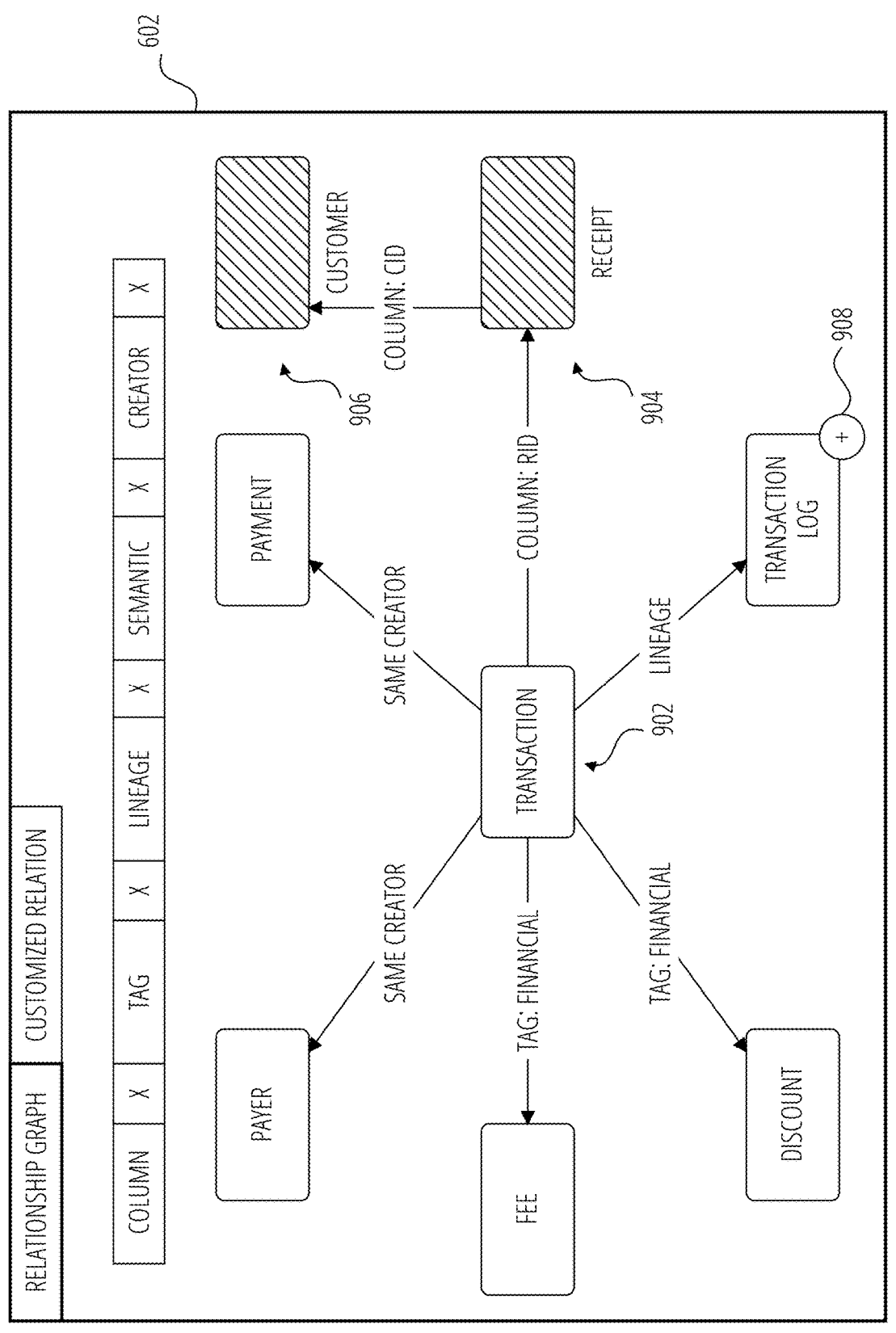
FIG. 9 is a user interface diagram illustrating the user interface of FIG. 6 as presented at the user device during a fourth stage, according to some examples.

At a fourth stage shown in FIG. 9, the user interface 602 shows a further updated relationship graph, according to some examples. Specifically, after viewing the relationship graph of FIG. 8, the user navigates back to the relationship graph of FIG. 6, and then selects the Transaction dataset, which is initially shown as a related dataset, as a new target dataset.

The dataset relation exploration system 132 then generates an updated relationship graph in which the Transaction dataset is the target dataset 902, and in which the related datasets for the Transaction dataset are presented. The updated relationship graph also shows previous target 904, Receipt, and previous target 906, Customer, and these objects are marked or highlighted within the user interface 602 to indicate that they are previous targets.

FIG. 9 also shows an add button 908 that is illustrated relative to a "Transaction Log" dataset. The user can select the add button 908 to add the dataset to a customized relation group, which is discussed with reference to FIG. 10. In some examples, the add button 908 appears relative to a particular dataset when the user makes a particular selection of, or hovers over, that dataset.

Figure 10:
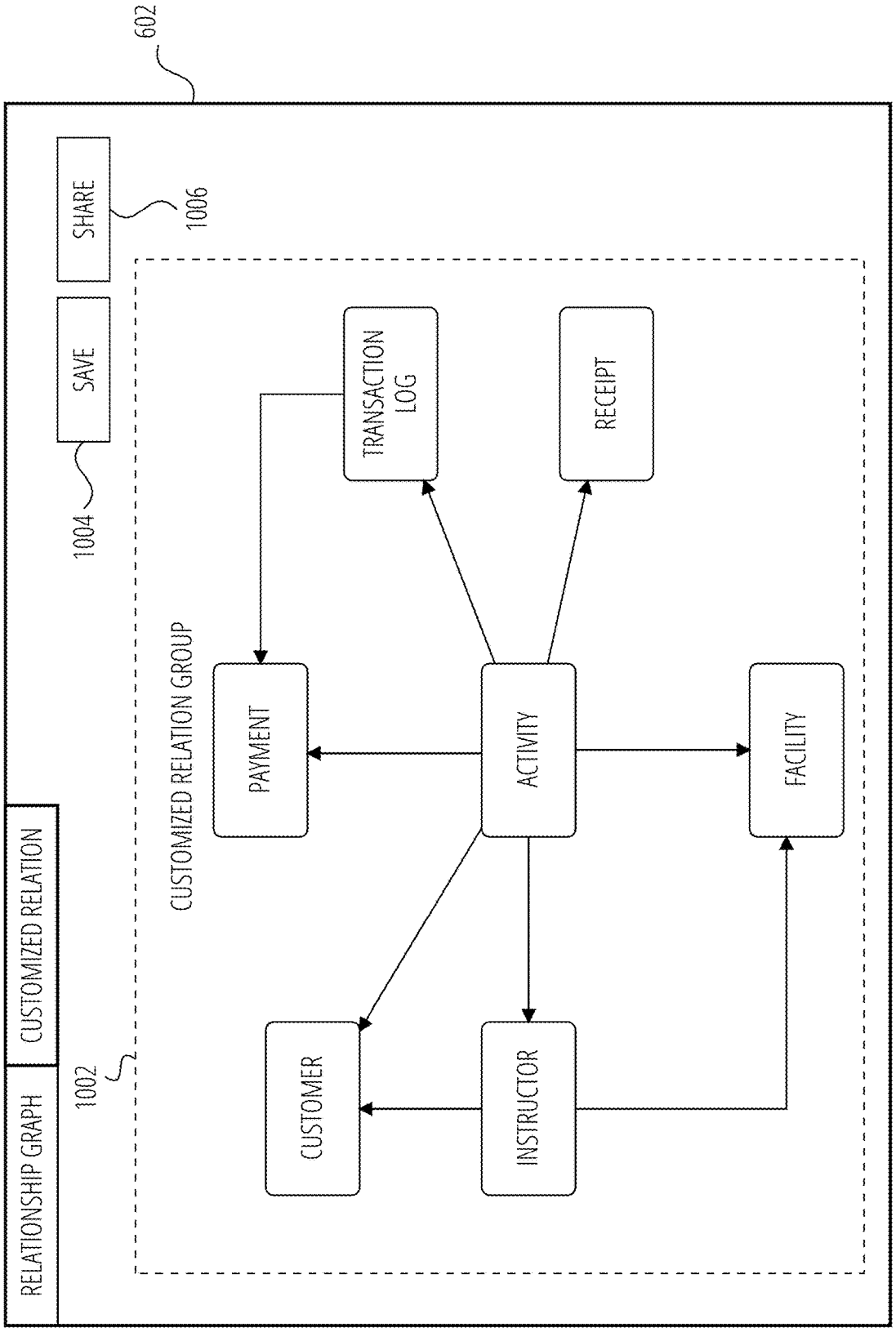
FIG. 10 is a user interface diagram illustrating the user interface of FIG. 6 as presented at the user device during a fifth stage, according to some examples.

At a fifth stage shown in FIG. 10, the user interface 602 shows a customized relation section (e.g., tab or page), according to some examples. For example, a group of datasets and their associated relationships can collectively represent a business concept. Using, for instance, a button such as the add button 908 in FIG. 9, the user can bundle several datasets together and then customize their relations.

In the examples of FIG. 6 to FIG. 10, as the user navigates through the relationship graphs, the user adds various datasets to a customized relation group 1002. In the case of FIG. 10, as the user navigates and views the relationship graphs, the user adds each of the following datasets: "Customer," "Payment," "Transaction Log," "Activity," "Receipt," "Facility," and "Instruction." As a result, these datasets are all added to the customized relation group 1002.

The user can make selections and changes to customize the relationships between the various datasets in the customized relation group, as illustrated by the edges in FIG. 10. The user interface 602 also provides a save button 1004 to enable the user to save the group, as well as a share button 1006 to enable the user to share the group (e.g., with other users of the dataset relation exploration system 132). This can save time and computing resources since duplication of efforts is avoided.

It is noted that examples in the present disclosure are inherently tied to computer technology and cannot be practically accomplished using human operations. For example, the dataset relation exploration system 132 processes large volumes of metadata, performs complex embedding calculations, and utilizes a language model to analyze and identify relationships across numerous datasets in real-time. The scale, speed, and accuracy of these operations, particularly in enterprise-level data environments, necessitate the use of computer systems. Furthermore, interactive, real-time visualization of dataset relationships requires computer-generated graphics and user interface technologies that are not feasible through manual means.

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one memory that stores instructions; and one or more processors configured by the instructions to perform operations comprising: receiving, via a user device, a selection of a target dataset of a plurality of datasets; automatically identifying related datasets for the target dataset by: comparing metadata of the target dataset with the metadata of other datasets of the plurality of datasets to identify first candidate datasets, comparing a metadata embedding of the target dataset with metadata embeddings of at least some of the other datasets to identify second candidate datasets, and causing processing of prompt data by a language model to generate output that identifies the related datasets, the prompt data comprising an instruction to select the related datasets from among the first candidate datasets and the second candidate datasets; generating, based on the output of the language model, a visual representation of relationships among the target dataset and the related datasets; and causing presentation of the visual representation in a user interface at the user device.

In Example 2, the subject matter of Example 1 includes, the operations further comprising: extracting, from one or more data sources, the metadata of each respective dataset of the plurality of datasets; storing the metadata of each respective dataset of the plurality of datasets in a relational database; generating the metadata embeddings by processing, for each respective dataset of the plurality of datasets, at least some of the metadata of the respective dataset; and storing the metadata embeddings in a vector database, wherein the comparing of the metadata of the target dataset with the metadata of the other datasets comprises automatically querying the relational database, and the comparing of the metadata embedding of the target dataset with the metadata embeddings of at least some of the other datasets comprises automatically querying the vector database.

In Example 3, the subject matter of Examples 1-2 includes, wherein the selection is a first selection, the target dataset is a first target dataset, and the related datasets are first related datasets, the operations further comprising: after causing the presentation of the visual representation in the user interface, receiving, via the user device, a second selection of a second target dataset from among the first related datasets represented in the user interface; identifying second related datasets for the second target dataset by comparing the metadata of the second target dataset with the metadata of the other datasets of the plurality of datasets, comparing the metadata embedding of the second target dataset with the metadata embeddings of at least some of the other datasets, and causing processing of further prompt data by the language model to generate further output that identifies the second related datasets; generating, based on the further output of the language model, an updated visual representation reflecting at least the second target dataset and the second related datasets; and causing presentation of the updated visual representation in the user interface.

In Example 4, the subject matter of Example 3 includes, wherein the updated visual representation reflects both the first target dataset and the second target dataset, the operations further comprising: automatically marking, within the updated visual representation, the first target dataset to indicate the first target dataset as a previous target.

In Example 5, the subject matter of Examples 1-4 includes, wherein the visual representation comprises a relationship graph that includes respective objects representing the target dataset and the related datasets, and further includes object connections representing the relationships among the target dataset and the related datasets, wherein the respective objects are user-selectable via the user interface to cause adjustment of the visual representation.

In Example 6, the subject matter of Examples 1-5 includes, wherein the identifying of the first candidate datasets comprises: detecting, based on a result of the comparing of the metadata of the target dataset with the metadata of the other datasets, the first candidate datasets as technical matches for the target dataset, wherein each of the first candidate datasets is matched with the target dataset based on at least one of a common attribute, a common data label, a common user profile attribute, or a data lineage relationship.

In Example 7, the subject matter of Examples 1-6 includes, wherein the identifying of the second candidate datasets comprises: detecting, based on a result of the comparing of the metadata embedding of the target dataset with the metadata embeddings of at least some of the other datasets, the second candidate datasets as semantic matches for the target data set.

In Example 8, the subject matter of Examples 1-7 includes, the operations further comprising dynamically generating the prompt data to provide the instruction to the language model, wherein the instruction comprises: a first instruction segment to analyze context data associated with the target dataset, the first candidate datasets, and the second candidate datasets; a second instruction segment to select, as the related datasets, a plurality of most relevant datasets from among the first candidate datasets and the second candidate datasets based on the analyzing of the context data; and a third instruction segment to generate the output in a structured format that includes the related datasets and descriptions of the relationships among the target dataset and the related datasets.

In Example 9, the subject matter of Example 8 includes, wherein the plurality of most relevant datasets is selected based on a number (e.g., a predetermined number) specified in the instruction to the language model.

In Example 10, the subject matter of Examples 1-9 includes, the operations further comprising: receiving, via the user device, input to create a custom relationship between two or more datasets included in the visual representation; and in response to receiving the input: generating an updated visual representation to reflect the custom relationship; and storing the custom relationship in a relational database.

In Example 11, the subject matter of Examples 1-10 includes, wherein the selection is a first selection, the operations further comprising: after causing the presentation of the visual representation in the user interface, receiving, via the user device, a second selection of a related dataset from among the related datasets represented in the user interface; in response to receiving the second selection, causing presentation of additional data associated with the related dataset together with the visual representation in the user interface.

In Example 12, the subject matter of Examples 1-11 includes, wherein the selection is a first selection, the operations further comprising: after causing the presentation of the visual representation in the user interface, receiving, via the user device, a second selection to access a related dataset from among the related datasets represented in the user interface; in response to receiving the second selection: accessing a data source to retrieve data from the related dataset; and causing replacement, within the user interface, of the visual representation with the data retrieved from the related dataset.

In Example 13, the subject matter of Examples 1-12 includes, the operations further comprising: after causing the presentation of the visual representation in the user interface, receiving, via the user device, a filtering request associated with at least one filtering parameter; in response to receiving the request, generating an updated visual representation by applying the at least one filtering parameter; and causing presentation of the updated visual representation in the user interface.

In Example 14, the subject matter of Examples 1-13 includes, wherein, for each dataset of the plurality of datasets, the metadata comprises at least one of a dataset name, a dataset description, a dataset type, a dataset version, one or more dataset columns, a user profile associated with the dataset, or a tag associated with the dataset.

Example 15 is a computer-implemented method performed by a computer system comprising a memory and at least one hardware processor, the computer-implemented method comprising: receiving, via a user device, a selection of a target dataset of a plurality of datasets; automatically identifying related datasets for the target dataset by: comparing metadata of the target dataset with the metadata of other datasets of the plurality of datasets to identify first candidate datasets, comparing a metadata embedding of the target dataset with metadata embeddings of at least some of the other datasets to identify second candidate datasets, and causing processing of prompt data by a language model to generate output that identifies the related datasets, the prompt data comprising an instruction to select the related datasets from among the first candidate datasets and the second candidate datasets; generating, based on the output of the language model, a visual representation of relationships among the target dataset and the related datasets; and causing presentation of the visual representation in a user interface at the user device.

In Example 16, the subject matter of Example 15 includes, extracting, from one or more data sources, the metadata of each respective dataset of the plurality of datasets; storing the metadata of each respective dataset of the plurality of datasets in a relational database; generating the metadata embeddings by processing, for each respective dataset of the plurality of datasets, at least some of the metadata of the respective dataset; and storing the metadata embeddings in a vector database, wherein the comparing of the metadata of the target dataset with the metadata of the other datasets comprises automatically querying the relational database, and the comparing of the metadata embedding of the target dataset with the metadata embeddings of at least some of the other datasets comprises automatically querying the vector database.

In Example 17, the subject matter of Examples 15-16 includes, wherein the selection is a first selection, the target dataset is a first target dataset, and the related datasets are first related datasets, the computer-implemented method further comprising: after causing the presentation of the visual representation in the user interface, receiving, via the user device, a second selection of a second target dataset from among the first related datasets represented in the user interface; identifying second related datasets for the second target dataset by comparing the metadata of the second target dataset with the metadata of the other datasets of the plurality of datasets, comparing the metadata embedding of the second target dataset with the metadata embeddings of at least some of the other datasets, and causing processing of further prompt data by the language model to generate further output that identifies the second related datasets; generating, based on the further output of the language model, an updated visual representation reflecting at least the second target dataset and the second related datasets; and causing presentation of the updated visual representation in the user interface.

Example 18 is one or more non-transitory computer-readable media storing computer-executable instructions that, when executed by a computing system, cause the computing system to perform operations comprising: receiving, via a user device, a selection of a target dataset of a plurality of datasets; automatically identifying related datasets for the target dataset by: comparing metadata of the target dataset with the metadata of other datasets of the plurality of datasets to identify first candidate datasets, comparing a metadata embedding of the target dataset with metadata embeddings of at least some of the other datasets to identify second candidate datasets, and causing processing of prompt data by a language model to generate output that identifies the related datasets, the prompt data comprising an instruction to select the related datasets from among the first candidate datasets and the second candidate datasets; generating, based on the output of the language model, a visual representation of relationships among the target dataset and the related datasets; and causing presentation of the visual representation in a user interface at the user device.

In Example 19, the subject matter of Example 18 includes, the operations further comprising: extracting, from one or more data sources, the metadata of each respective dataset of the plurality of datasets; storing the metadata of each respective dataset of the plurality of datasets in a relational database; generating the metadata embeddings by processing, for each respective dataset of the plurality of datasets, at least some of the metadata of the respective dataset; and storing the metadata embeddings in a vector database, wherein the comparing of the metadata of the target dataset with the metadata of the other datasets comprises automatically querying the relational database, and the comparing of the metadata embedding of the target dataset with the metadata embeddings of at least some of the other datasets comprises automatically querying the vector database.

In Example 20, the subject matter of Examples 18-19 includes, wherein the selection is a first selection, the target dataset is a first target dataset, and the related datasets are first related datasets, the operations further comprising: after causing the presentation of the visual representation in the user interface, receiving, via the user device, a second selection of a second target dataset from among the first related datasets represented in the user interface; identifying second related datasets for the second target dataset by comparing the metadata of the second target dataset with the metadata of the other datasets of the plurality of datasets, comparing the metadata embedding of the second target dataset with the metadata embeddings of at least some of the other datasets, and causing processing of further prompt data by the language model to generate further output that identifies the second related datasets; generating, based on the further output of the language model, an updated visual representation reflecting at least the second target dataset and the second related datasets; and causing presentation of the updated visual representation in the user interface.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 11:
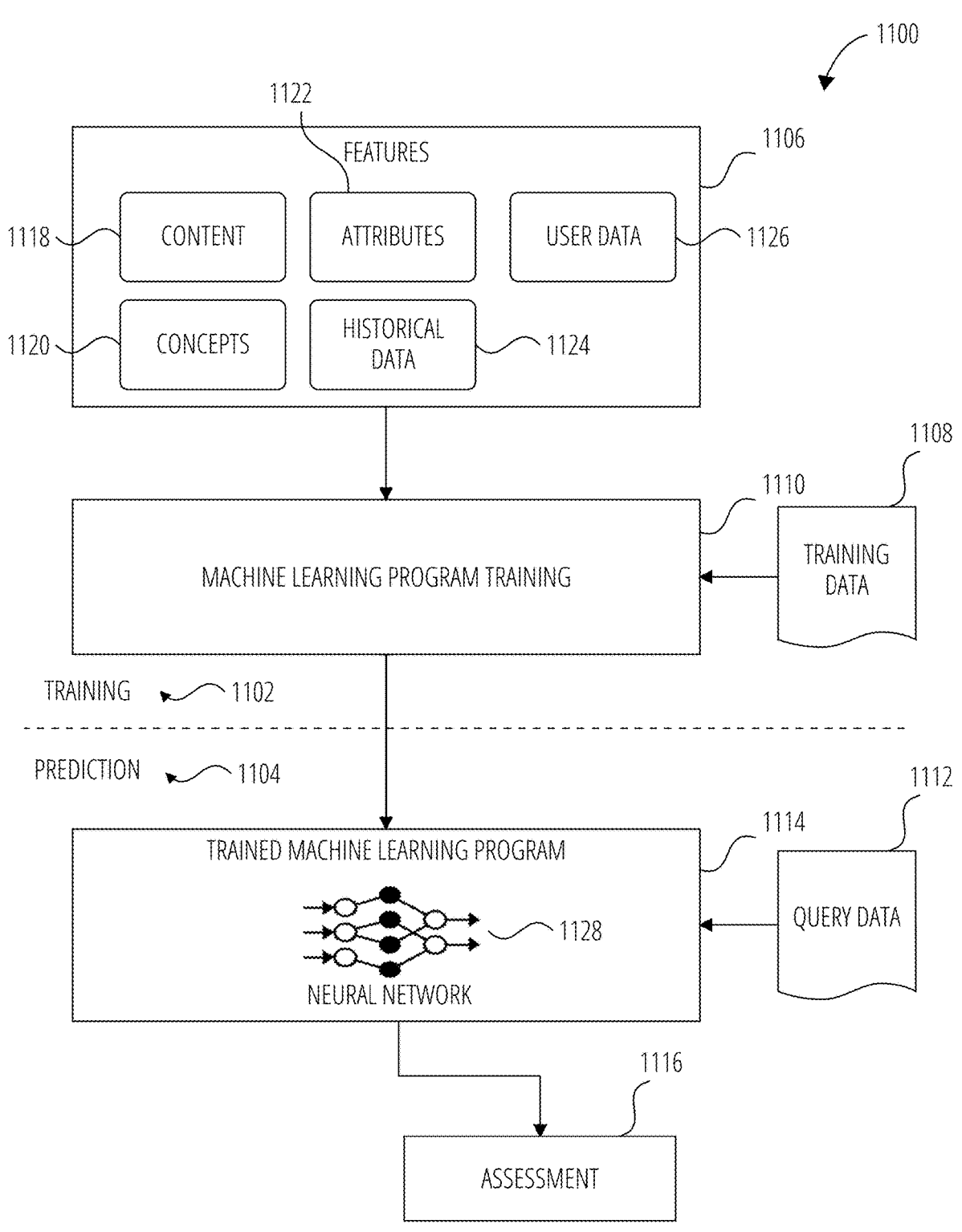
FIG. 11 diagrammatically illustrates training and use of a machine learning program, according to some examples.

FIG. 11 is a block diagram showing a machine learning program 1100, according to some examples. Machine learning programs, also referred to as machine learning algorithms or tools, may be used as part of the systems described herein to perform one or more operations.

Machine learning is a field of study that gives computers the ability to learn without being explicitly programmed. Machine learning explores the study and construction of algorithms, also referred to herein as tools, that may learn from or be trained using existing data and make predictions about or based on new data. Such machine learning tools operate by building a model from example training data 1108 in order to make data-driven predictions or decisions expressed as outputs or assessments (e.g., assessment 1116). Although examples are presented with respect to a few machine learning tools, the principles presented herein may be applied to other machine learning tools.

In some examples, different machine learning tools may be used. For example, Logistic Regression (LR), Naive-Bayes, Random Forest (RF), neural networks (NN), matrix factorization, and Support Vector Machines (SVM) tools may be used.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine learning program 1100 supports two types of phases, namely training phases 1102 and prediction phases 1104. In training phases 1102, supervised learning, unsupervised or reinforcement learning may be used. For example, the machine learning program 1100 (1) receives features 1106 (e.g., as structured or labeled data in supervised learning) and/or (2) identifies features 1106 (e.g., unstructured or unlabeled data for unsupervised learning) in training data 1108. In prediction phases 1104, the machine learning program 1100 uses the features 1106 for analyzing query data 1112 to generate outcomes or predictions, as examples of an assessment 1116.

In the training phase 1102, feature engineering is used to identify features 1106 and may include identifying informative, discriminating, and independent features for the effective operation of the machine learning program 1100 in pattern recognition, classification, and regression. In some examples, the training data 1108 includes labeled data, which is known data for pre-identified features 1106 and one or more outcomes. Each of the features 1106 may be a variable or attribute, such as individual measurable property of a process, article, system, or phenomenon represented by a data set (e.g., the training data 1108). Features 1106 may also be of different types, such as numeric features, strings, and graphs, and may include one or more of content 1118, concepts 1120, attributes 1122, historical data 1124 and/or user data 1126, merely for example.

The concept of a feature in this context is related to that of an explanatory variable used in statistical techniques such as linear regression. Choosing informative, discriminating, and independent features is important for the effective operation of the machine learning program 1100 in pattern recognition, classification, and regression. Features may be of different types, such as numeric features, strings, and graphs.

In training phases 1102, the machine learning program 1100 uses the training data 1108 to find correlations among the features 1106 that affect a predicted outcome or assessment 1116. With the training data 1108 and the identified features 1106, the machine learning program 1100 is trained during the training phase 1102 at machine learning program training 1110. The machine learning program 1100 appraises values of the features 1106 as they correlate to the training data 1108. The result of the training is the trained machine learning program 1114 (e.g., a trained or learned model).

Further, the training phases 1102 may involve machine learning, in which the training data 1108 is structured (e.g., labeled during preprocessing operations), and the trained machine learning program 1114 implements a relatively simple neural network 1128 capable of performing, for example, classification and clustering operations. In other examples, the training phase 1102 may involve deep learning, in which the training data 1108 is unstructured, and the trained machine learning program 1114 implements a deep neural network 1128 that is able to perform both feature extraction and classification/clustering operations.

A neural network 1128 generated during the training phase 1102, and implemented within the trained machine learning program 1114, may include a hierarchical (e.g., layered) organization of neurons. For example, neurons (or nodes) may be arranged hierarchically into a number of layers, including an input layer, an output layer, and multiple hidden layers. Each of the layers within the neural network 1128 can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron.

In some examples, the neural network 1128 may also be one of a number of different types of neural networks, including a single-layer feed-forward network, an Artificial Neural Network (ANN), a Recurrent Neural Network (RNN), a symmetrically connected neural network, and unsupervised pre-trained network, a transformer network, a Convolutional Neural Network (CNN), or a Recursive Neural Network (RNN), merely for example. During prediction phases 1104, the trained machine learning program 1114 is used to perform an assessment. Query data 1112 is provided as an input to the trained machine learning program 1114, and the trained machine learning program 1114 generates the assessment 1116 as output, responsive to receipt of the query data 1112.

In some examples, the trained machine learning program 1114 may comprise a generative AI model. Generative AI is a term that may refer to AI that can create new content. For example, generative AI can produce text, images, video, audio, code, or synthetic data.

Some of the techniques that may be used in, or in conjunction with, generative AI are:

GANs: GANs may include two neural networks: a generator and a discriminator. The generator network attempts to create realistic content that can "fool" the discriminator network, while the discriminator network attempts to distinguish between real and fake content. The generator and discriminator networks compete with each other and improve over time.

Variational autoencoders (VAEs): VAEs may encode input data into a latent space (e.g., a compressed representation) and then decode it back into output data. The latent space can be manipulated to generate new variations of the output data. VAEs may use self-attention mechanisms to process input data, allowing them to handle long text sequences and capture complex dependencies.

Transformer models: Transformer models may use attention mechanisms to learn the relationships between different parts of input data (such as words or pixels) and generate output data based on these relationships. Transformer-based models can handle sequential data, such as text or speech, as well as non-sequential data, such as images or code. For example, a Large Language Model (LLM) or other language model may be a transformer model, or may be based on a transformer model. Non-limiting examples of LLMs that use transformer models include GPT-4 (Generative Pre-trained Transformer 4) developed by OpenAI™, BERT (Bidirectional Encoder Representations from Transformers) developed by Google™, LLaMA (Large Language Model Meta AI) developed by Meta™, PaLM2 (Pathways Language Model 2) developed by Google™, and Claude 3 developed by Anthropic™.

In generative AI examples, the assessment 1116 generated as a response or output by the trained machine learning program 1114 may include predictions, translations, summaries, answers to questions, suggestions, media content, or combinations thereof. For example, the assessment 1116 generated as a response by a generative model, such as an LLM, can include a list of related datasets together with a corresponding list of the determined relationship between each of the related datasets and a target dataset.

In some examples, a machine learning model may be fine-tuned. The term "fine-tuning," as used herein, generally refers to a process of adapting a pre-trained or "base" machine learning model. For example, a machine learning model may be adapted to improve its performance on a specific task or to make it more suitable for a specific operation. Fine-tuning techniques may include one or more of updating or changing a pre-trained model's internal parameters through additional training, injecting new trainable weights or layers into the model architecture and training on those weights or layers, modifying a model topology by altering layers or connections, changing aspects of the training process (such as loss functions or optimization methods), or any other adaptations that may, for example, result in better model performance on a particular task compared to the pre-trained model.

Figure 12:
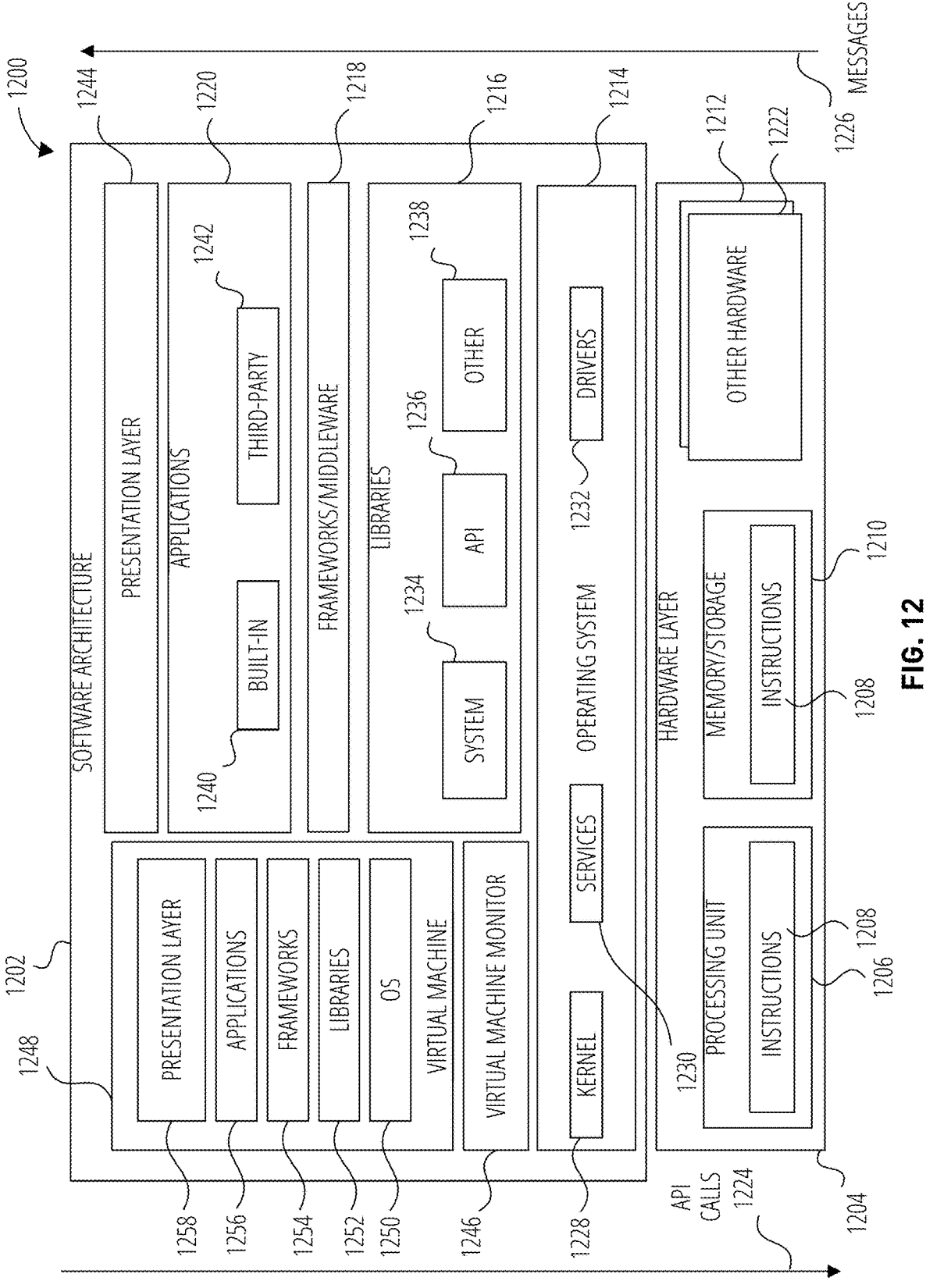
FIG. 12 is a block diagram showing a software architecture for a computing device, according to some examples.

FIG. 12 is a block diagram 1200 showing a software architecture 1202 for a computing device, according to some examples. The software architecture 1202 may be used in conjunction with various hardware architectures, for example, as described herein. FIG. 12 is merely a non-limiting illustration of a software architecture, and many other architectures may be implemented to facilitate the functionality described herein. A representative hardware layer 1204 is illustrated and can represent, for example, any of the above referenced computing devices. In some examples, the hardware layer 1204 may be implemented according to the architecture of the computer system of FIG. 13.

The representative hardware layer 1204 comprises one or more processing units 1206 having associated executable instructions 1208. Executable instructions 1208 represent the executable instructions of the software architecture 1202, including implementation of the methods, modules, subsystems, and components, and so forth described herein and may also include memory and/or storage modules 1210, which also have executable instructions 1208. Hardware layer 1204 may also comprise other hardware as indicated by other hardware 1212 and other hardware 1222 which represent any other hardware of the hardware layer 1204, such as the other hardware illustrated as part of the software architecture 1202.

In the architecture of FIG. 12, the software architecture 1202 may be conceptualized as a stack of layers where each layer provides particular functionality. For example, the software architecture 1202 may include layers such as an operating system 1214, libraries 1216, frameworks/middleware layer 1218, applications 1220, and presentation layer 1244. Operationally, the applications 1220 or other components within the layers may invoke API calls 1224 through the software stack and access a response, returned values, and so forth illustrated as messages 1226 in response to the API calls 1224. The layers illustrated are representative in nature and not all software architectures have all layers. For example, some mobile or special purpose operating systems may not provide a frameworks/middleware layer 1218, while others may provide such a layer. Other software architectures may include additional or different layers.

The operating system 1214 may manage hardware resources and provide common services. The operating system 1214 may include, for example, a kernel 1228, services 1230, and drivers 1232. The kernel 1228 may act as an abstraction layer between the hardware and the other software layers. For example, the kernel 1228 may be responsible for memory management, processor management (e.g., scheduling), component management, networking, security settings, and so on. The services 1230 may provide other common services for the other software layers. In some examples, the services 1230 include an interrupt service. The interrupt service may detect the receipt of an interrupt and, in response, cause the software architecture 1202 to pause its current processing and execute an interrupt service routine (ISR) when an interrupt is accessed.

The drivers 1232 may be responsible for controlling or interfacing with the underlying hardware. For instance, the drivers 1232 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 1216 may provide a common infrastructure that may be utilized by the applications 1220 or other components or layers. The libraries 1216 typically provide functionality that allows other software modules to perform tasks in an easier fashion than to interface directly with the underlying operating system 1214 functionality (e.g., kernel 1228, services 1230 or drivers 1232). The libraries 1216 may include system libraries 1234 (e.g., C standard library) that may provide functions such as memory allocation functions, string manipulation functions, mathematic functions, and the like. In addition, the libraries 1216 may include API libraries 1236 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1216 may also include a wide variety of other libraries 1238 to provide many other APIs to the applications 1220 and other software components/modules.

The frameworks/middleware layer 1218 may provide a higher-level common infrastructure that may be utilized by the applications 1220 or other software components/modules. For example, the frameworks/middleware layer 1218 may provide various graphic user interface (GUI) functions, high-level resource management, high-level location services, and so forth. The frameworks/middleware layer 1218 may provide a broad spectrum of other APIs that may be utilized by the applications 1220 or other software components/modules, some of which may be specific to a particular operating system or platform.

The applications 1220 include built-in applications 1240 or third-party applications 1242. Examples of representative built-in applications 1240 may include, but are not limited to, a contacts application, a browser application, a book reader application, a location application, a media application, a messaging application, or a game application. Third-party applications 1242 may include any of the built-in applications as well as a broad assortment of other applications. In a specific example, the third-party application 1242 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1242 may invoke the API calls 1224 provided by the mobile operating system such as operating system 1214 to facilitate functionality described herein.

The applications 1220 may utilize built in operating system functions (e.g., kernel 1228, services 1230 or drivers 1232), libraries (e.g., system libraries 1234, API libraries 1236, and other libraries 1238), and frameworks/middleware layer 1218 to create user interfaces to interact with users of the system. Alternatively, or additionally, in some systems, interactions with a user may occur through a presentation layer, such as presentation layer 1244. In these systems, the application/module "logic" can be separated from the aspects of the application/module that interact with a user.

Some software architectures utilize virtual machines. In the example of FIG. 12, this is illustrated by virtual machine 1248. A virtual machine creates a software environment where applications/modules can execute as if they were executing on a hardware computing device. A virtual machine is hosted by a host operating system (operating system 1214) and typically, although not always, has a virtual machine monitor 1246, which manages the operation of the virtual machine as well as the interface with the host operating system (e.g., operating system 1214). A software architecture executes within the virtual machine 1248 such as an operating system 1250, libraries 1252, frameworks/middleware 1254, applications 1256 or presentation layer 1258. These layers of software architecture executing within the virtual machine 1248 can be the same as corresponding layers previously described or may be different.

Certain examples are described herein as including logic or a number of components, modules, or mechanisms. Modules or components may constitute either software modules/components (e.g., code embodied (1) on a non-transitory machine-readable medium or (2) in a transmission signal) or hardware-implemented modules/components. A hardware-implemented module/component is a tangible unit capable of performing certain operations and may be configured or arranged in a certain manner. In examples, one or more computer systems (e.g., a standalone, client, or server computer system) or one or more hardware processors may be configured by software (e.g., an application or application portion) as a hardware-implemented module/component that operates to perform certain operations as described herein.

In various examples, a hardware-implemented module/component may be implemented mechanically or electronically. For example, a hardware-implemented module/component may comprise dedicated circuitry or logic that is permanently configured (e.g., as a special-purpose processor, such as a field programmable gate array (FPGA) or an application-specific integrated circuit (ASIC)) to perform certain operations. A hardware-implemented module/component may also comprise programmable logic or circuitry (e.g., as encompassed within a general-purpose processor or another programmable processor) that is temporarily configured by software to perform certain operations.

Accordingly, the term "hardware-implemented module" or "hardware-implemented component" should be understood to encompass a tangible entity, be that an entity that is physically constructed, permanently configured (e.g., hard-wired), or temporarily or transitorily configured (e.g., programmed) to operate in a certain manner or to perform certain operations described herein. Considering examples in which hardware-implemented modules/components are temporarily configured (e.g., programmed), each of the hardware-implemented modules/components need not be configured or instantiated at any one instance in time. For example, where the hardware-implemented modules/components comprise, a general-purpose processor configured using software, the general-purpose processor may be configured as respective different hardware-implemented modules/components at different times. Software may accordingly configure a processor, for example, to constitute a particular hardware-implemented module/component at one instance of time and to constitute a different hardware-implemented module/component at a different instance of time.

Hardware-implemented modules/components can provide information to, and receive information from, other hardware-implemented modules/components. Accordingly, the described hardware-implemented modules/components may be regarded as being communicatively coupled. Where multiple of such hardware-implemented modules/components exist contemporaneously, communications may be achieved through signal transmission (e.g., over appropriate circuits and buses that connect the hardware-implemented modules/components). In examples in which multiple hardware-implemented modules/components are configured or instantiated at different times, communications between such hardware-implemented modules/components may be achieved, for example, through the storage and retrieval of information in memory structures to which the multiple hardware-implemented modules/components have access. For example, one hardware-implemented module/component may perform an operation, and store the output of that operation in a memory device to which it is communicatively coupled. A further hardware-implemented module/component may then, at a later time, access the memory device to retrieve and process the stored output.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules/components that operate to perform one or more operations or functions. The modules/components referred to herein may, in some examples, comprise processor-implemented modules/components.

Similarly, the methods described herein may be at least partially processor-implemented. For example, at least some of the operations of a method may be performed by one or more processors or processor-implemented modules/components. The performance of certain of the operations may be distributed among the one or more processors, not only residing within a single machine, but deployed across a number of machines.

The one or more processors may also operate to support performance of the relevant operations in a "cloud computing" environment or as a "software as a service (Saas)." For example, at least some of the operations may be performed by a group of computers (as examples of machines including processors), these operations being accessible via a network (e.g., the Internet) and via one or more appropriate interfaces (e.g., APIs).

Examples may be implemented in digital electronic circuitry, or in computer hardware, firmware, or software, or in combinations of them. Examples may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

Figure 13:
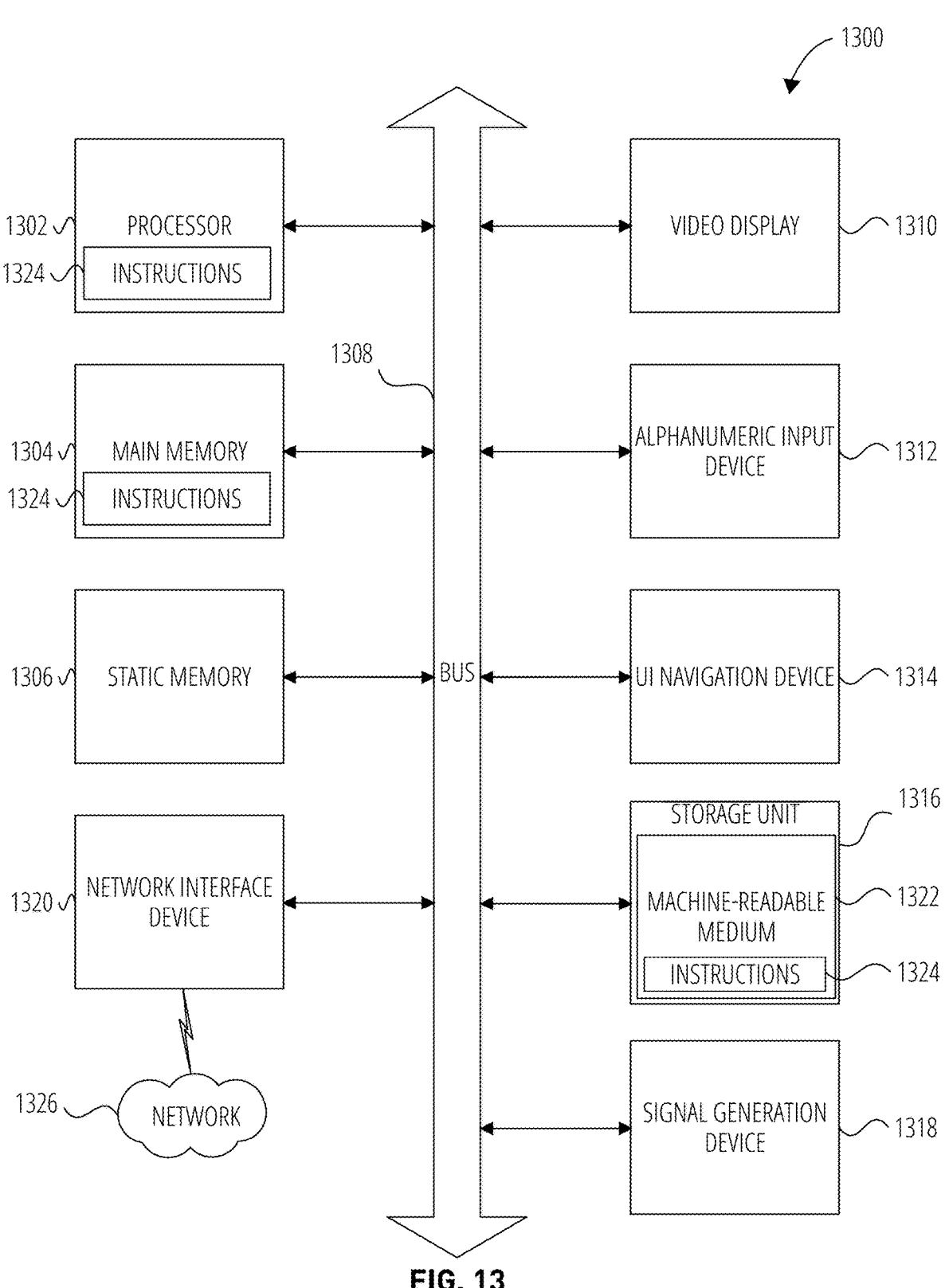
FIG. 13 is a block diagram of a machine in the form of a computer system, according to some examples, within which instructions may be executed for causing the machine to perform any one or more of the methodologies discussed herein.

FIG. 13 is a block diagram of a machine in the example form of a computer system 1300 within which instructions 1324 may be executed for causing the machine to perform any one or more of the methodologies discussed herein. In alternative examples, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a GPU, or both), a primary or main memory 1304, and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard or a touch-sensitive display screen), a UI navigation (or cursor control) device 1314 (e.g., a mouse), a storage unit 1316, a signal generation device 1318 (e.g., a speaker), and a network interface device 1320.

As used herein, the term "processor" may refer to any one or more circuits or virtual circuits (e.g., a physical circuit emulated by logic executing on an actual processor) that manipulates data values according to control signals (e.g., commands, opcodes, machine code, control words, macro-instructions, etc.) and which produces corresponding output signals that are applied to operate a machine. A processor may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof. A processor may be a multi-core processor having two or more independent processors (sometimes referred to as "cores") that may execute instructions contemporaneously. Multi-core processors may contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. A processor may be emulated in software, running on a physical processor, as a virtual processor or virtual circuit. The virtual processor may behave like an independent processor but is implemented in software rather than hardware.

The storage unit 1316 includes a machine-readable medium 1322 on which is stored one or more sets of data structures and instructions 1324 (e.g., software) embodying or utilized by any one or more of the methodologies or functions described herein. The instructions 1324 may also reside, completely or at least partially, within the main memory 1304 or within the processor 1302 during execution thereof by the computer system 1300, with the main memory 1304 and the processor 1302 also each constituting a machine-readable medium 1322.

While the machine-readable medium 1322 is shown in accordance with some examples to be a single medium, the term "machine-readable medium" may include a single medium or multiple media (e.g., a centralized or distributed database, or associated caches and servers) that store the one or more instructions 1324 or data structures. The term "machine-readable medium" shall also be taken to include any tangible medium that is capable of storing, encoding, or carrying instructions 1324 for execution by the machine and that cause the machine to perform any one or more of the methodologies of the present disclosure, or that is capable of storing, encoding, or carrying data structures utilized by or associated with such instructions 1324. The term "machine-readable medium" shall accordingly be taken to include, but not be limited to, solid-state memories, and optical and magnetic media. Specific examples of a machine-readable medium 1322 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

The instructions 1324 may further be transmitted or received over a communications network 1326 using a transmission medium. The instructions 1324 may be transmitted using the network interface device 1320 and any one of a number of well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding, or carrying instructions 1324 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the subject matter may be referred to herein, individually or collectively, by the term "example" merely for convenience and without intending to voluntarily limit the scope of this application to any single example or concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively. Except as otherwise indicated, the word "or" in reference to a list of two or more items, covers all of the following interpretations of the word: any one of the items in the list, all of the items in the list, and any combination of the items in the list.

Although some examples, such as those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence. The term "operation" is used to refer to elements in the drawings of this disclosure for ease of reference and it will be appreciated that each "operation" may identify one or more operations, processes, actions, or steps, and may be performed by one or multiple components.

What is claimed is:

1. A system comprising:
at least one memory that stores instructions; and
one or more processors configured by the instructions to perform operations comprising:
receiving, via a user device, a selection of a target dataset of a plurality of datasets;
in response to the receiving of the selection of the target dataset:
automatically identifying related datasets for the target dataset by:
comparing metadata of the target dataset with the metadata of other datasets of the plurality of datasets to identify first candidate datasets;
comparing a metadata embedding of the target dataset with metadata embeddings of at least some of the other datasets to identify second candidate datasets;
generating prompt data based on a predetermined prompt structure, the prompt data comprising:
a first instruction segment to a language model to analyze context data associated with the target dataset, the first candidate datasets, and the second candidate datasets, and
a second instruction segment to the language model to select the related datasets as a plurality of most relevant datasets from among the first candidate datasets and the second candidate datasets based on analyzing of the context data, the second instruction segment being different from the first instruction segment; and
after generating the prompt data, transmitting the prompt data to the language model to generate output that identifies the related datasets;
generating, based on the output of the language model, a visual representation of relationships among the target dataset and the related datasets; and
causing presentation of the visual representation of the relationships among the target dataset and the related datasets in a user interface at the user device, the visual representation including the plurality of most relevant datasets.

2. The system of claim 1, the operations further comprising:

extracting, from one or more data sources, the metadata of each respective dataset of the plurality of datasets;
storing the metadata of each respective dataset of the plurality of datasets in a relational database;
generating the metadata embeddings by processing, for each respective dataset of the plurality of datasets, at least some of the metadata of the respective dataset; and
storing the metadata embeddings in a vector database,
wherein the comparing of the metadata of the target dataset with the metadata of the other datasets comprises automatically querying the relational database, and the comparing of the metadata embedding of the target dataset with the metadata embeddings of at least some of the other datasets comprises automatically querying the vector database.

3. The system of claim 1, wherein the selection is a first selection, the target dataset is a first target dataset, and the related datasets are first related datasets, the operations further comprising:
after causing the presentation of the visual representation in the user interface, receiving, via the user device, a second selection of a second target dataset from among the first related datasets represented in the user interface;
identifying second related datasets for the second target dataset by comparing the metadata of the second target dataset with the metadata of the other datasets of the plurality of datasets, comparing the metadata embedding of the second target dataset with the metadata embeddings of at least some of the other datasets, and causing processing of further prompt data by the language model to generate further output that identifies the second related datasets;
generating, based on the further output of the language model, an updated visual representation reflecting at least the second target dataset and the second related datasets; and
causing presentation of the updated visual representation in the user interface.

4. The system of claim 3, wherein the updated visual representation reflects both the first target dataset and the second target dataset, the operations further comprising:
automatically marking, within the updated visual representation, the first target dataset to indicate the first target dataset as a previous target.

5. The system of claim 1, wherein the visual representation comprises a relationship graph that includes respective objects representing the target dataset and the related datasets, and further includes object connections representing the relationships among the target dataset and the related datasets, wherein the respective objects are user-selectable via the user interface to cause adjustment of the visual representation.

6. The system of claim 1, wherein the identifying of the first candidate datasets comprises:
detecting, based on a result of the comparing of the metadata of the target dataset with the metadata of the other datasets, the first candidate datasets as technical matches for the target dataset, wherein each first candidate dataset of the first candidate datasets is matched with the target dataset based on at least one of a common attribute, a common data label, a common user profile attribute, or a data lineage relationship.

7. The system of claim 1, wherein the identifying of the second candidate datasets comprises:

detecting, based on a result of the comparing of the metadata embedding of the target dataset with the metadata embeddings of at least some of the other datasets, the second candidate datasets as semantic matches for the target dataset.

8. The system of claim 1, wherein the prompt data further comprises:

a third instruction segment to generate the output in a structured format that includes the related datasets and descriptions of the relationships among the target dataset and the related datasets.

9. The system of claim 1, wherein the plurality of most relevant datasets is selected based on a number specified in the prompt data transmitted to the language model.

10. The system of claim 1, the operations further comprising:

receiving, via the user device, input to create a custom relationship between two or more datasets included in the visual representation; and in response to receiving the input:

generating an updated visual representation to reflect the custom relationship; and storing the custom relationship in a relational database.

11. The system of claim 1, wherein the selection is a first selection, the operations further comprising:

after causing the presentation of the visual representation in the user interface, receiving, via the user device, a second selection of a related dataset from among the related datasets represented in the user interface; and in response to receiving the second selection, causing presentation of additional data associated with the related dataset together with the visual representation in the user interface.

12. The system of claim 1, wherein the selection is a first selection, the operations further comprising:

after causing the presentation of the visual representation in the user interface, receiving, via the user device, a second selection to access a related dataset from among the related datasets represented in the user interface; and in response to receiving the second selection:

accessing a data source to retrieve data from the related dataset; and causing replacement, within the user interface, of the visual representation with the data retrieved from the related dataset.

13. The system of claim 1, the operations further comprising:

after causing the presentation of the visual representation in the user interface, receiving, via the user device, a filtering request associated with at least one filtering parameter;

in response to receiving the request, generating an updated visual representation by applying the at least one filtering parameter; and causing presentation of the updated visual representation in the user interface.

14. The system of claim 1, wherein, for each dataset of the plurality of datasets, the metadata comprises at least one of a dataset name, a dataset description, a dataset type, a dataset version, one or more dataset columns, a user profile associated with the dataset, or a tag associated with the dataset.

15. A computer-implemented method performed by a computer system comprising a memory and at least one hardware processor, the computer-implemented method comprising:

receiving, via a user device, a selection of a target dataset of a plurality of datasets;

in response to the receiving of the selection of the target dataset:

automatically identifying related datasets for the target dataset by:

comparing metadata of the target dataset with the metadata of other datasets of the plurality of datasets to identify first candidate datasets;

comparing a metadata embedding of the target dataset with metadata embeddings of at least some of the other datasets to identify second candidate datasets;

generating prompt data based on a predetermined prompt structure, the prompt data comprising:

a first instruction segment to a language model to analyze context data associated with the target dataset, the first candidate datasets, and the second candidate datasets, and a second instruction segment to the language model to select the related datasets as a plurality of most relevant datasets from among the first candidate datasets and the second candidate datasets based on analyzing of the context data, the second instruction segment being different from the first instruction segment; and after generating the prompt data, transmitting the prompt data to the language model to generate output that identifies the related datasets;

generating, based on the output of the language model, a visual representation of relationships among the target dataset and the related datasets; and causing presentation of the visual representation of the relationships among the target dataset and the related datasets in a user interface at the user device, the visual representation including the plurality of most relevant datasets.

16. The computer-implemented method of claim 15, further comprising:

extracting, from one or more data sources, the metadata of each respective dataset of the plurality of datasets;

storing the metadata of each respective dataset of the plurality of datasets in a relational database;

generating the metadata embeddings by processing, for each respective dataset of the plurality of datasets, at least some of the metadata of the respective dataset; and storing the metadata embeddings in a vector database, wherein the comparing of the metadata of the target dataset with the metadata of the other datasets comprises automatically querying the relational database, and the comparing of the metadata embedding of the target dataset with the metadata embeddings of at least some of the other datasets comprises automatically querying the vector database.

17. The computer-implemented method of claim 15, wherein the selection is a first selection, the target dataset is a first target dataset, and the related datasets are first related datasets, the computer-implemented method further comprising:

after causing the presentation of the visual representation in the user interface, receiving, via the user device, a second selection of a second target dataset from among the first related datasets represented in the user interface;

identifying second related datasets for the second target dataset by comparing the metadata of the second target dataset with the metadata of the other datasets of the plurality of datasets, comparing the metadata embedding of the second target dataset with the metadata embeddings of at least some of the other datasets, and causing processing of further prompt data by the language model to generate further output that identifies the second related datasets;

generating, based on the further output of the language model, an updated visual representation reflecting at least the second target dataset and the second related datasets; and causing presentation of the updated visual representation in the user interface.

18. One or more non-transitory computer-readable media storing computer-executable instructions that, when executed by a computing system, cause the computing system to perform operations comprising:

receiving, via a user device, a selection of a target dataset of a plurality of datasets;

in response to the receiving of the selection of the target dataset:

automatically identifying related datasets for the target dataset by:

comparing metadata of the target dataset with the metadata of other datasets of the plurality of datasets to identify first candidate datasets;

comparing a metadata embedding of the target dataset with metadata embeddings of at least some of the other datasets to identify second candidate datasets;

generating prompt data based on a predetermined prompt structure, the prompt data comprising:

a first instruction segment to a language model to analyze context data associated with the target dataset, the first candidate datasets, and the second candidate datasets, and a second instruction segment to the language model to select the related datasets as a plurality of most relevant datasets from among the first candidate datasets and the second candidate datasets based on analyzing of the context data, the second instruction segment being different from the first instruction segment; and after generating the prompt data, transmitting the prompt data to the language model to generate output that identifies the related datasets;

generating, based on the output of the language model, a visual representation of relationships among the target dataset and the related datasets; and causing presentation of the visual representation of the relationships among the target dataset and the related datasets in a user interface at the user device, the visual representation including the plurality of most relevant datasets.

19. The one or more non-transitory computer-readable media of claim 18, the operations further comprising:

extracting, from one or more data sources, the metadata of each respective dataset of the plurality of datasets;

storing the metadata of each respective dataset of the plurality of datasets in a relational database;

generating the metadata embeddings by processing, for each respective dataset of the plurality of datasets, at least some of the metadata of the respective dataset; and storing the metadata embeddings in a vector database, wherein the comparing of the metadata of the target dataset with the metadata of the other datasets comprises automatically querying the relational database, and the comparing of the metadata embedding of the target dataset with the metadata embeddings of at least some of the other datasets comprises automatically querying the vector database.

20. The one or more non-transitory computer-readable media of claim 18, wherein the selection is a first selection, the target dataset is a first target dataset, and the related datasets are first related datasets, the operations further comprising:

after causing the presentation of the visual representation in the user interface, receiving, via the user device, a second selection of a second target dataset from among the first related datasets represented in the user interface;

identifying second related datasets for the second target dataset by comparing the metadata of the second target dataset with the metadata of the other datasets of the plurality of datasets, comparing the metadata embedding of the second target dataset with the metadata embeddings of at least some of the other datasets, and causing processing of further prompt data by the language model to generate further output that identifies the second related datasets;

generating, based on the further output of the language model, an updated visual representation reflecting at least the second target dataset and the second related datasets; and causing presentation of the updated visual representation in the user interface.

* * * * *